United States Patent
Shibayama et al.

(10) Patent No.: US 7,856,526 B2
(45) Date of Patent: Dec. 21, 2010

(54) STORAGE APPARATUS AND POWER-SAVING CONTROL METHOD OF STORAGE APPARATUS

(75) Inventors: Tsukasa Shibayama, Kawasaki (JP); Yuri Hiraiwa, Sagamihara (JP); Daisuke Shinohara, Yokohama (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 12/013,662

(22) Filed: Jan. 14, 2008

(65) Prior Publication Data

US 2008/0266698 A1 Oct. 30, 2008

(30) Foreign Application Priority Data

Apr. 26, 2007 (JP) ............................. 2007-116316

(51) Int. Cl.
*G06F 13/00* (2006.01)
(52) U.S. Cl. .............................. 711/112; 711/E12.001; 360/69
(58) Field of Classification Search .................. 713/324
See application file for complete search history.

(56) References Cited

U.S. PATENT DOCUMENTS

| | | | |
|---|---|---|---|
| 6,583,947 B1 * | 6/2003 | Hakamata et al. | 360/69 |
| 7,355,806 B2 * | 4/2008 | Hakamata et al. | 360/69 |
| 7,360,037 B2 * | 4/2008 | Higaki et al. | 711/154 |
| 7,529,950 B2 * | 5/2009 | Deguchi et al. | 713/300 |
| 2006/0107010 A1 * | 5/2006 | Hirezaki et al. | 711/165 |

FOREIGN PATENT DOCUMENTS

| | | |
|---|---|---|
| JP | 2000-293314 | 10/2000 |
| JP | 2004-326244 | 11/2004 |

\* cited by examiner

*Primary Examiner*—Hetul Patel
*Assistant Examiner*—John P Fishburn
(74) *Attorney, Agent, or Firm*—Antonelli, Terry, Stout & Kraus, LLP.

(57) ABSTRACT

Access to the physical disks is differentiated as access from a host computer, and access based on processing (data migration processing, copy processing) for storage management. Whether to switch the state of the physical disks from a normal power consumption mode to a power saving mode is determined according to the access from the host computer after the access based on processing for storage management is complete, and the state of the physical disks are switched from the normal power consumption mode to the power saving mode based on the determination result.

4 Claims, 34 Drawing Sheets

FIG.2

SCHEDULING TABLE 124

| LUN | SCHEDULING TABLE | DISKS FOR COMPOSING VOLUME | OPERATION START TIME | OPERATION END TIME | DEFAULT POWER SAVING CONDITION |
|---|---|---|---|---|---|
| 0 | Storage1.Dev1 | Storage1.Disk1<br>Storage1.Disk2<br>Storage1.Disk3<br>Storage1.Disk4 | 08:00 | 17:00 | NO ACCESS FOR 60 MIN. |
| 1 | Storage1.Dev2 | Storage1.Disk1<br>Storage1.Disk2<br>Storage1.Disk3<br>Storage1.Disk4 | 06:00 | 22:00 | NO ACCESS FOR 30 MIN. |
| 2 | Storage1.Dev3 | Storage1.Disk1<br>Storage1.Disk2<br>Storage1.Disk3<br>Storage1.Disk4 | - | - | NO ACCESS FOR 30 MIN. |

ACCESS MANAGEMENT TABLE 224

| HOST IDENTIFIER | VOLUME IDENTIFIER | DISKS FOR COMPOSING VOLUME | DISKS FOR COMPOSING VOLUME OF MIGRATION DESTINATION | DISKS FOR COMPOSING VOLUME OF MIGRATION DESTINATION | LAST ACCESS TIME BY HOST | POWER SAVING CONDITION |
|---|---|---|---|---|---|---|
| Host1 | Storage1.Dev1 | Storage1.Disk1 Storage1.Disk2 Storage1.Disk3 Storage1.Disk4 | Storage2.Dev1 | Storage2.Disk1 Storage2.Disk2 Storage2.Disk3 Storage2.Disk4 | 2006:12:15: 00:30:00 | 30 MIN. |
| Host2 | Storage1.Dev2 | Storage1.Disk1 Storage1.Disk2 Storage1.Disk3 Storage1.Disk4 | Storage2.Dev2 | Storage2.Disk1 Storage2.Disk2 Storage2.Disk3 Storage2.Disk4 | 2006:12:15: 00:12:00 | 40 MIN. |
| Host3 | Storage1.Dev3 | Storage1.Disk1 Storage1.Disk2 Storage1.Disk3 Storage1.Disk4 | - | - | 2006:12:15: 01:04:00 | 60 MIN. |

PROCESSING FLOW BY MANAGEMENT SERVER: MODE 1
(S101)

PROCESSING FLOW BY MANAGEMENT SERVER: MODE 2
(S102)

PROCESSING FLOW BY STORAGE APPARATUS: MODE 1
(S103, S104)

PROCESSING FLOW BY MANAGEMENT SERVER: MODE 4
(S108)

PROCESSING FLOW BY STORAGE APPARATUS: MODE 2 (S111)

FIG.16

ACCESS MANAGEMENT TABLE 224b

| HOST IDENTIFIER | VOLUME IDENTIFIER | DISKS FOR COMPOSING VOLUME | COPY DESTINATION VOLUME IDENTIFIER | DISKS FOR COMPOSING VOLUME OF COPY DESTINATION | ACCESS TIME BY HOST | POWER SHUTDOWN CONDITION |
|---|---|---|---|---|---|---|
| 2240 | 2241 | 2242 | 2243b | 2244b | 2245 | 2246 |
| Host1 | Storage1.Dev1 | Storage1.Disk1<br>Storage1.Disk2<br>Storage1.Disk3<br>Storage1.Disk4 | Storage2.Dev1 | Storage2.Disk1<br>Storage2.Disk2<br>Storage2.Disk3<br>Storage2.Disk4 | 2006:12:15:<br>00:30:00 | 30 MIN. |
| Host2 | Storage1.Dev2 | Storage1.Disk1<br>Storage1.Disk2<br>Storage1.Disk3<br>Storage1.Disk4 | Storage2.Dev2 | Storage2.Disk1<br>Storage2.Disk2<br>Storage2.Disk3<br>Storage2.Disk4 | 2006:12:15:<br>00:12:00 | 40 MIN. |
| Host3 | Storage1.Dev3 | Storage1.Disk1<br>Storage1.Disk2<br>Storage1.Disk3<br>Storage1.Disk4 | - | - | 2006:12:15:<br>01:04:00 | 60 MIN. |

PROCESSING FLOW BY MANAGEMENT SERVER: MODE 7
(S1102)

PROCESSING FLOW BY STORAGE APPARATUS: MODE 3
(S1103, S1104)

PROCESSING FLOW BY MANAGEMENT SERVER: MODE 8
(S1108, S1109)

FIG.22

ACCESS MANAGEMENT TABLE 224c

| HOST IDENTIFIER | VOLUME IDENTIFIER | DISKS FOR COMPOSING VOLUME | MIGRATION DESTINATION VOLUME IDENTIFIER | DISKS FOR COMPOSING VOLUME OF MIGRATION DESTINATION | TIME TO SAVE POWER |
|---|---|---|---|---|---|
| Host1 | Storage1.Dev1 | Storage1.Disk1<br>Storage1.Disk2<br>Storage1.Disk3<br>Storage1.Disk4 | Storage2.Dev1 | Storage2.Disk1<br>Storage2.Disk2<br>Storage2.Disk3<br>Storage2.Disk4 | 1000 SEC. |
| Host2 | Storage1.Dev2 | Storage1.Disk1<br>Storage1.Disk2<br>Storage1.Disk3<br>Storage1.Disk4 | Storage2.Dev2 | Storage2.Disk1<br>Storage2.Disk2<br>Storage2.Disk3<br>Storage2.Disk4 | 1500 SEC. |
| Host3 | Storage1.Dev3 | Storage1.Disk1<br>Storage1.Disk2<br>Storage1.Disk3<br>Storage1.Disk4 | - | - | 2000 SEC. |

FIG.23

SCHEDULING TABLE 324

| VOLUME IDENTIFIER | DISKS FOR COMPOSING VOLUME | OPERATION START TIME | OPERATION END TIME | DEFAULT POWER SAVING CONDITION | TIME TO SAVE POWER |
|---|---|---|---|---|---|
| Storage1.Dev1 | Storage1.Disk1<br>Storage1.Disk2<br>Storage1.Disk3<br>Storage1.Disk4 | 08:00 | 17:00 | NO ACCESS FOR 60 MIN. | 1000 SEC. |
| Storage1.Dev2 | Storage1.Disk1<br>Storage1.Disk2<br>Storage1.Disk3<br>Storage1.Disk4 | 06:00 | 22:00 | NO ACCESS FOR 30 MIN. | 500 SEC. |
| Storage1.Dev3 | Storage1.Disk1<br>Storage1.Disk2<br>Storage1.Disk3<br>Storage1.Disk4 | - | - | NO ACCESS FOR 30 MIN. | 2000 SEC. |

HOST/VOLUME CORRESPONDING TABLE 325

| HOST WWN (3250) | VOLUME IDENTIFIER (3251) |
|---|---:|
| 10:00:00:03:3E:00:00:03 | Dev1 |
| 10:00:01:03:76:01:00:02 | Dev2 |
| 10:00:02:03:DF:00:00:03 | Dev3 |

PROCESSING FOR DISTINGUISHING SENDER OF COMMANDS BY STORAGE APPARATUS

PROCESSING FLOW: MODE 3

PROCESSING FLOW BY STORAGE APPARATUS: MODE 4
(S1605, S1606)

FIG.30

ACCESS MANAGEMENT TABLE 224d

| HOST IDENTIFIER (2240) | VOLUME IDENTIFIER (2241) | DISKS FOR COMPOSING VOLUME (2242) | COPY DESTINATION VOLUME IDENTIFIER (2243d) | DISKS FOR COMPOSING VOLUME OF COPY DESTINATION (2244d) | TIME TO SHUT DOWN POWER (2247) |
|---|---|---|---|---|---|
| Host1 | Storage1.Dev1 | Storage1.Disk1<br>Storage1.Disk2<br>Storage1.Disk3<br>Storage1.Disk4 | Storage2.Dev1 | Storage2.Disk1<br>Storage2.Disk2<br>Storage2.Disk3<br>Storage2.Disk4 | 1000 SEC. |
| Host2 | Storage1.Dev2 | Storage1.Disk1<br>Storage1.Disk2<br>Storage1.Disk3<br>Storage1.Disk4 | Storage2.Dev2 | Storage2.Disk1<br>Storage2.Disk2<br>Storage2.Disk3<br>Storage2.Disk4 | 1500 SEC. |
| Host3 | Storage1.Dev3 | Storage1.Disk1<br>Storage1.Disk2<br>Storage1.Disk3<br>Storage1.Disk4 | - | - | 2000 SEC. |

PROCESSING FLOW: MODE 4

FIG.33

EXTERNAL VOLUME MAPPING TABLE 327

| VOLUME IDENTIFIER | WWN OF EXTERNAL PORT | APPARATUS IDENTIFIER OF EXTERNAL STORAGE APPARATUS | VOLUME IDENTIFIER OF EXTERNAL STORAGE APPARATUS |
|---|---|---|---|
| Storage1.Dev1 | 10:00:34:5E:··· | Storage3 | Storage3.Dev1 |
| Storage2.Dev1 | 10:00:34:8D:··· | Storage4 | Storage4.Dev1 |

STORAGE APPARATUS AND POWER-SAVING CONTROL METHOD OF STORAGE APPARATUS

CROSS REFERENCES

This application relates to and claims priority from Japanese Patent Application No. 2007-116316, filed on Apr. 26, 2007, the entire disclosure of which is incorporated herein by reference.

BACKGROUND

The present invention relates to a storage apparatus, and a power-saving control method of a storage apparatus.

In recent years, with a storage apparatus that provides a storage area of a plurality of physical disks as a logical volume to a host computer, such storage apparatus is able to comprise a multitude of physical disks. When the scale of the storage apparatus becomes large like this, the amount of power consumption will also increase. In particular, since the power consumption costs will be extremely high in a data center possessing a plurality of such large-scale storage apparatuses, the reduction of power consumption costs is strongly demanded.

Thus, in order to reduce the amount of power consumption of a storage apparatus, technology has been proposed for stopping the supply of power to physical disks that are not accessed from the host system for a certain period of time, or switching the state of such physical disks from a normal power consumption mode to a power saving mode capable of activating the physical disks immediately (refer to Japanese Patent Laid-Open Publication No. 2000-293314; "Patent Document 1").

SUMMARY

With the conventional technology described in Patent Document 1, power saving of the storage apparatus is realized by switching the status of the physical disks from a normal power consumption mode to a power saving mode after the lapse of a prescribed period from the time the physical disks were last accessed.

This means that the storage apparatus is not able to switch the status of the physical disks from a normal power consumption mode to a power saving mode while the host computer is not accessing the physical disks containing data to be migrated during such prescribed period because the access to the physical disks occurs by the process for the management of the storage apparatus, and this was one reason that the storage apparatus consumed extra power.

Thus, an object of the present invention is to reduce the amount of power consumption of the storage apparatus.

In order to achieve the foregoing object, one aspect of the present invention provides a storage apparatus comprising a logical volume switch-controlled between a normal power consumption mode and a power saving mode, and a processor that switches the status of the logical volume from the normal power consumption mode to the power saving mode if data is not being transferred between the logical volume and another logical volume after the lapse of a prescribed period of time from the last access from a host computer to the logical volume of the normal power consumption mode.

Another aspect of the present invention provides a storage apparatus comprising a logical volume switch-controlled between a normal power consumption mode and a power saving mode, and a processor that continues the normal power consumption mode of the logical volume when data is being transferred between the logical volume and another logical volume after the lapse of a prescribed period of time from the last access from a host computer to the logical volume of the normal power consumption mode.

Incidentally, the term "normal power consumption mode" as used herein shall mean a state where a storage device like physical disks corresponding to logical volumes is able to promptly reply to the access to a logical volume. Further, the term "power saving mode" shall mean a state where a storage device like physical disks corresponding to logical volumes is controlled to reduce the power consumption and is not able to promptly reply to the access to a logical volume. The way to control for reducing the power consumption, for instance, includes the reduction of the rotating speed of physical disks, and the cutoff of power supply to physical disks.

The present invention is thereby able to realize the reduction of the amount of power consumption of the storage apparatus.

DESCRIPTION OF DRAWINGS

FIG. 2 shows an example of a scheduling table;
FIG. 3 shows an example of an access management table;
FIG. 16 shows an example of an access management table;
FIG. 22 shows an example of an access management table;
FIG. 23 shows an example of a power saving condition table;
FIG. 24 shows an example of a host-volume correspondence table.

FIG. 30 shows an example of an access management table;

FIG. 33 shows an example of an external volume mapping table; and

DETAILED DESCRIPTION

Embodiments of the present invention are now explained with reference to the attached drawings.

In this embodiment, the access to physical disks is differentiated as access based on an access command from a host computer, and access based on processing for managing the storage apparatus. Incidentally, access based on processing for managing the storage apparatus is access to the physical disks that does not go through the host computer, and, for instance, is access to the physical disks for performing data migration processing between storage apparatuses.

In this embodiment, in the case of data migration processing, for example, power saving control is performed so as to switch the state of the physical disks from a normal power consumption mode to a power saving mode based on the time that the host computer accessed the storage apparatus, and the time the storage apparatus completes the data migration.

The first embodiment is described below.

Figure 1:
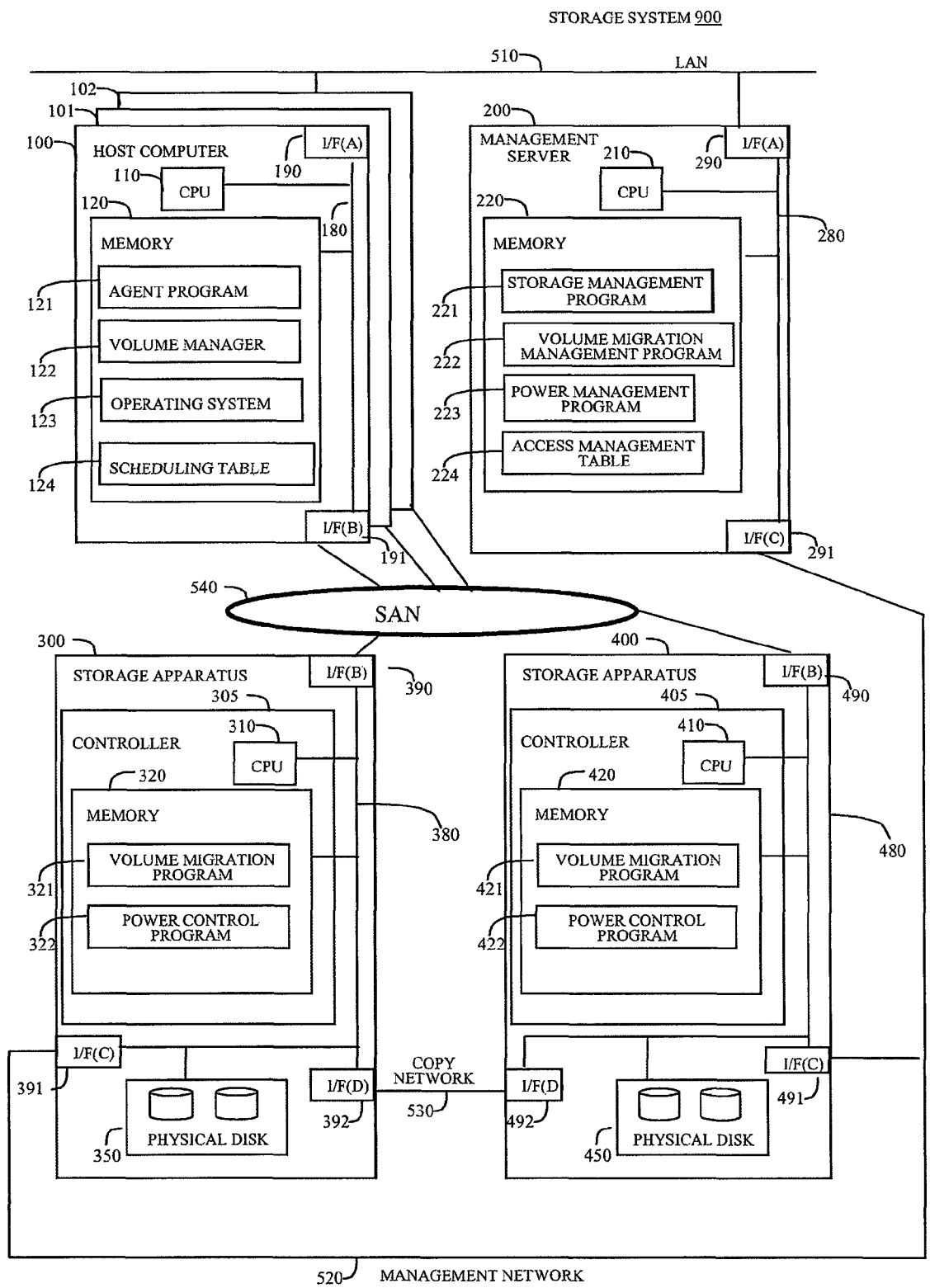
FIG. 1 shows the first mode of a system configuration.

FIG. 1 is an explanatory diagram showing the configuration of a storage system 900 according to an embodiment of the present invention. This storage system 900 comprises host computers 100, 101, 102, a management server 200, and storage apparatuses 300, 400. The host computers 100, 101, 102 and the storage apparatuses 300, 400 are respectively connected via a storage area network (SAN) 540. The storage apparatuses 300, 400 are connected to the management server 200 via a management network 520. Further, the host computers 100, 101, 102 and the management server 200 are respectively connected via a local area network (Local Area Network) LAN 510. Moreover, the storage apparatus 300 and the storage apparatus 400 are connected via a copy network 530. In addition, the LAN 510, the management network 520, the copy network 530, and the SAN 540 may be the same network.

The host computers 100, 101, 102 comprise a CPU (Central Processing Unit) 110, a memory 120, an interface 190 for connecting to the local area network LAN 510, and an interface 191 for connecting to the storage area network SAN 540. The respective constituent elements are mutually connected via a bus 180. Functions of the host computers 100, 101, 102 are realized by the CPU 110 executing programs. The memory 120 stores data and programs to be used by the CPU 110. The memory 120 includes an agent program 121, a volume manager 122, an operation system 123, and a scheduling table 124. The agent program 121 is a program to be executed by the CPU 110, and is a program that coordinates with a storage management program 221 of the management server 200 described later to transfer information of the host computers 100, 101, 102 to the management server 200. The volume manager 122 is a program to be executed by the CPU 110, and executes the mount/unmount processing of the logical volumes provided from the storage apparatuses 300, 400. The operation system 123 is a program for managing the access from the host computers 100, 101, 102 to the storage apparatuses 300, 400. The scheduling table 124 retains the usage schedule and the like of logical volumes used by the applications of the host computers 100, 101, 102. The scheduling table 124 is now explained in detail with reference to FIG. 2. As shown in FIG. 2, the scheduling table 124 comprises six columns; namely, a LUN 1240 as an identifier of logical volumes from the host computers 100, 101, 102, a volume identifier 1241 as an identifier of logical volumes from the storage apparatus, disks for composing volume 1242 as physical disks constituting logical volumes, an operation start time 1243 showing the start time of the operation of applications of the host computers 100, 101, 102 using logical volumes, an operation end time 1244 showing the end time of the applications of the host computers 100, 101, 102 using logical volumes, and a default power saving condition 1245 showing a prescribed period until the state of the physical disks set to each logical volume are switched from a normal power consumption mode to a power saving mode.

When the applications using the logical volumes are not being operated, the physical disks are controlled to be in a power saving mode. Even when the applications using the logical volumes are being operated (in other words, when the current time is between the operation start time 1243 and the operation end time 1244 regarding such logical volumes), the state of the physical disks can be switched from a normal power consumption mode to a power saving mode after the lapse of a prescribed period from the last time the logical volumes were accessed. The condition for switching the state of the physical disks from a normal power consumption mode to a power saving mode; that is, the prescribed period from the last time the logical volumes were accessed to the switch of the state of the physical disks from a normal power consumption mode to a power saving mode is referred to as the default power saving condition 1245. Further, to switch the state of the physical disks from a normal power consumption mode to a power saving mode means, for instance, to change the rotating speed of physical disks to a low speed where the physical disks can be activated promptly, or to stop the supply of power to the physical disks.

Incidentally, when the operation start time 1243 and the operation end time 1244 are not designated, this means that the application using such logical volumes is currently being operated. The host computers 100, 101, 102 additionally comprise a data input device for the user of the host computers 100, 101, 102 to input data, and a display device for presenting information to the user of the host computers 100, 101, 102, but these are omitted here.

The management server 200 comprises a CPU 210, a memory 220, an interface 290 for connecting to the local area network LAN 510, and an interface 291 for connecting to the management network 520. The respective constituent elements are mutually connected via a bus 280. Functions of the management server 200 are realized by the CPU 210 executing programs. The memory 220 stores data and programs to be used by the CPU 210. The memory 220 includes a storage management program 221, a volume migration management program 222, a power management program 223, and an access management table 224.

The storage management program 221 acquires system configuration information from the storage apparatuses 300, 400 via the management network 520, stores such information in the access management table 224, and manages the system configuration. Further, the storage management program 221 coordinates with the agent program 121 in the host computers 100, 101, 102 via the LAN 510, acquires system configuration information of the host computers 100, 101, 102, and manages the system configuration of the host computers 100, 101, 102. Moreover, the storage management program 221 coordinates with the agent program 121 in the host computers 100, 101, 102, acquires information concerning the access time to the storage apparatuses 300, 400 of the host computers 100, 101, 102 of the operating system 123 and the information stored in the scheduling table 124, and stores such information in the access management table 224 of the management server 200. The volume migration management program 222 is a program for managing the data migration between the logical volumes of the storage apparatus, and executes data migration processing between the logical volumes by coordinating with the volume migration programs 321, 421 of the storage apparatuses 300, 400. The power management program 223 uses the information stored in the access management table 224 to determine whether to switch the state of the physical disks from a normal power consumption mode to a power saving mode. Further, the power management program 223 is a program that coordinates with the power control programs 322, 422 of the storage apparatuses 300, 400 to switch the state of the physical disks 350, 450 of the storage apparatuses 300, 400 from a normal power consumption mode to a power saving mode. The access management table 224 retains configuration information of the storage apparatus acquired from the storage apparatuses 300, 400 based on processing of the storage management program 221, and information concerning the access situation from the host computers 100, 101, 102 to the storage apparatuses 300, 400 acquired from the host computers 100, 101, 102.

The access management table 224 is now explained in detail with reference to FIG. 3. As shown in FIG. 3, the access management table includes seven columns; namely, a host identifier 2240, a volume identifier 2241 as an identifier of logical volumes to be recognized by the storage apparatus, disks for composing volume 2242 as information showing the physical disks constituting such logical volumes, a migration destination volume identifier 2243 as an identifier of logical volumes of the data migration destination, disks for composing volume of migration destination 2244 as physical disks of the migration destination, a last access time by host 2245 as the last time that the host computers 100, 101, 102 accessed the respective logical volumes, and a power saving condition 2246 as the period from the last access time from the host computers 100, 101, 102 to the time that the state of the physical disks can be switched from a normal power consumption mode to a power saving mode. The power saving condition 2246 as used herein shall mean the period from the last access time by host to the switch of the state of the physical disks from a normal power consumption mode to a power saving mode, and, as described later, is decided according to the operation start time 1243, the operation end time 1244 and the default power saving condition 1245 stored in the scheduling table 124.

The storage management program 221 associates the volume identifier 1241 of the scheduling table 124 and the volume identifier 2241 of the access management table 224, and stores the information acquired from the host computers 100, 101, 102 in the respective columns of the access management table 224. The last access time by host 2245 is information acquired from the operating system 123 of the host computers 100, 101, 102.

As described later, the management server 200 acquires, from the respective host computers 100, 101, 102, information concerning the last time the host computers 100, 101, 102 accessed the logical volumes of the storage apparatus, and stores such information in the last access time by host 2245 of the access management table 224. In other words, the access management table 224 is reflected with access based on an access command from the host computers 100, 101, 102 among the accesses to the physical disks 350, 450 of the storage apparatuses 300, 400. Further, when there are a plurality of host computers 100, 101, 102, access to the storage apparatuses 300, 400, as shown in FIG. 3, will be reflected in the access management table 224 by differentiating the access for each of the host computers 100, 101, 102 that issued an access command.

The management server 200 additionally comprises a data input device for the user of the management server 200 to input data, and a display device for presenting information to the user of the management server 200, but these are omitted here. Incidentally, the display device may also display information stored in the access management table 224 of the management server 200.

The storage apparatuses 300, 400 provide the data storage areas of the physical disks 350, 450 as logical volumes to the host computers 100, 101, 102. The storage apparatus 300 comprises a controller 305, physical disks 350, an interface 390 for connection with the storage area network SAN 540, an interface 391 for connection with the management network 520, and an interface 392 for connection with the copy network 530. Further, there are one or more physical disks 350. The respective constituent elements are mutually connected via a bus 380. The controller 305 comprises a CPU 310 and a memory 320. Further, the memory 320 stores program to be used by the CPU 310 in executing various types of processing.

The memory 320 includes at least a volume migration program 321, and a power control program 322.

The volume migration program 321 is a program that receives a command of the volume migration management program 222 of the management server 200, and executes data migration between logical volumes. The power control program 422 is a program that receives a command of the power management program 223 of the management server 200, and switches the state of the physical disks 350 from a normal power consumption mode to a power saving mode.

Incidentally, the storage apparatus 400 is configured the same as the storage apparatus 300.

Figure 4:
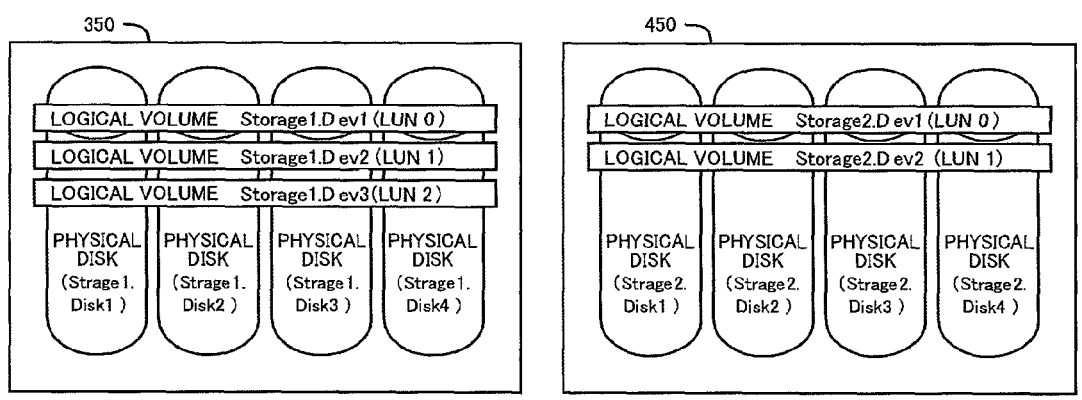
FIG. 4 shows the relationship of physical disks and logical volumes.

FIG. 4 shows the relationship of the physical disks 350, 450 and the logical volumes of the storage apparatuses 300, 400. The logical volumes provided by the storage apparatuses 300, 400 to the host computers 100, 101, 102 are arranged across data storage areas of a plurality of physical disks 350. There are a plurality of logical volumes, and each logical volume is given an identifier.

The overall processing flow of this embodiment is now explained.

The operating system 123 of the host computers 100, 101, 102 retains the history of access commands such as Read commands and Write commands issued from the host computers 100, 101, 102 to the storage apparatuses 300, 400. In other words, the host computers 100, 101, 102 retain information concerning the last time an access command was issued from the host computers 100, 101, 102 to the physical disks of the storage apparatus. Meanwhile, data migration processing (processing for managing the storage apparatus) is executed by the volume migration management program 222 of the management server 200 coordinating with the volume migration programs 321, 421 of the storage apparatuses 300, 400. The storage management program 221 of the management server 200 starts the processing triggered by the completion of access to the physical disks of the storage apparatuses 300, 400 arising for data migration processing. The storage management program 221 of the management server 200 coordinate with the agent program 121 of the host computers 100, 101, 102, acquires from the host computers 100, 101, 102 information concerning the last time the host computers 100, 101, 102 issued an access command to the physical disks of the storage apparatus, and stores such information in the access management table 224. The management server 200 is thereby able to manage the access to the physical disks of the storage apparatus based on an access command issued from the host computers 100, 101, 102, and access based on data migration processing (processing for managing the storage apparatus). Then, the power management program 223 of the management server 200 uses the information stored in the access management table 224 to determine whether to switch the state of the physical disks from a normal power consumption mode to a power saving mode, and, according to the determination result, coordinates with the power control programs 322, 422 of the storage apparatuses 300, 400 and switches the state of the physical disks from a normal power consumption mode to a power saving mode.

As a result of the foregoing processing, access to the physical disks is differentiated as access based on an access command from the host computers 100, 101, 102, and access based on processing for managing the storage apparatus. As a result of controlling the physical disks of the storage apparatus according to the access from the host computer, it is possible to realize the reduction in the amount of power consumption of the storage apparatus.

Details of the processing in this embodiment are now explained with reference to FIG. 5 to FIG. 14.

Figure 5:
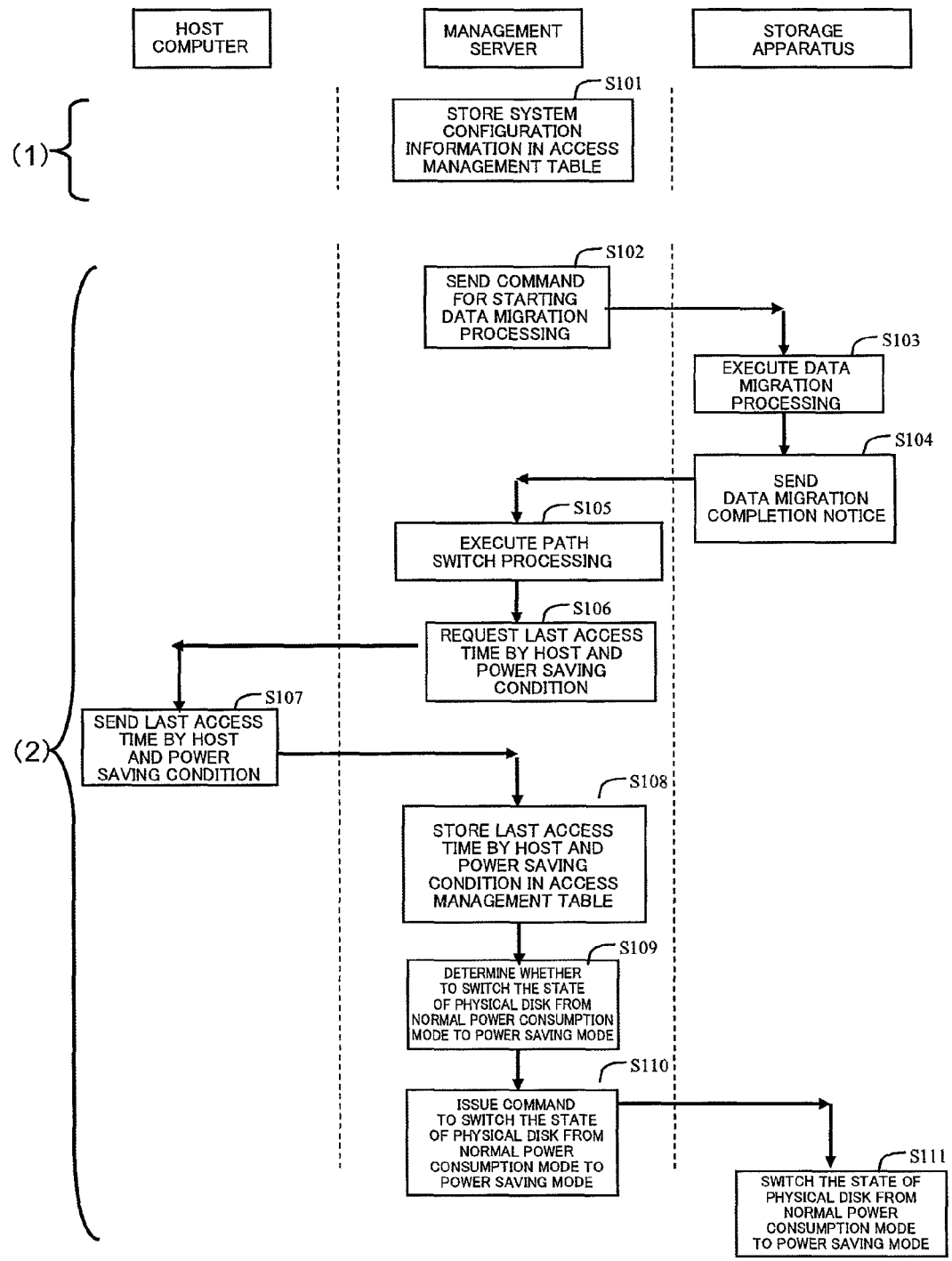
FIG. 5 shows the first mode of the overall processing flow.

FIG. 5 shows the processing flow among the respective apparatuses. The processing shown in FIG. 5(1) is the processing for performing the initial setting of the storage system 900, and the processing shown in FIG. 5(2) is the processing in a case where data migration processing between logical volumes arises in the storage system 900.

Foremost, at flow S101, the management server 200 acquires system configuration information from the storage apparatuses 300, 400 and the host computers 100, 101, 102 under its control, and stores the system configuration information in the access management table 224.

Subsequently, at flow S102, the management server 200 sends a command to the storage apparatuses 300, 400 to start data migration processing between logical volumes.

Subsequently, at flow S103, the storage apparatuses 300, 400 that received a command for data migration processing from the management server 200 execute data migration processing between logical volumes based on the command from the management server 200.

At flow S104, the storage apparatuses 300, 400 send a completion notice of data migration processing to the management server 200.

Subsequently, at flow S105, the management server 200 performs path switch processing of logical volumes triggered by receiving the data migration completion notice from the storage apparatuses 300, 400.

Subsequently, at flow S106, the management server 200 sends a request to the respective host computers 100, 101, 102 for the last access time by host which is the last time the host computers 100, 101, 102 accessed the storage apparatuses 300, 400, and information concerning the power saving condition set to each logical volume as the period from the last access time to the time that the state of the physical disks can be switched from a normal power consumption mode to a power saving mode.

Subsequently, at flow S107, the host computers 100, 101, 102 send to the management server 200 the information concerning the last access time by host and the power saving condition according to the request from the management server 200.

Subsequently, at flow S108, the management server 200 stores the information received from the host computers 100, 101, 102 in the access management table 224.

At flow S109, the management server uses the information stored in the access management table 224 and determines whether to switch the state of the physical disks of the storage apparatus to be subject to data migration from a normal power consumption mode to a power saving mode.

Subsequently, at flow S110, the management server 200 sends a command to the storage apparatuses 300, 400 for switching the state of the physical disks from a normal power consumption mode to a power saving mode according to the determination result at S109.

Finally, at flow S111, the storage apparatuses 300, 400 that received the command from the management server 200 switches the state of the instructed physical disks 350, 450 from a normal power consumption mode to a power saving mode.

Figure 6:
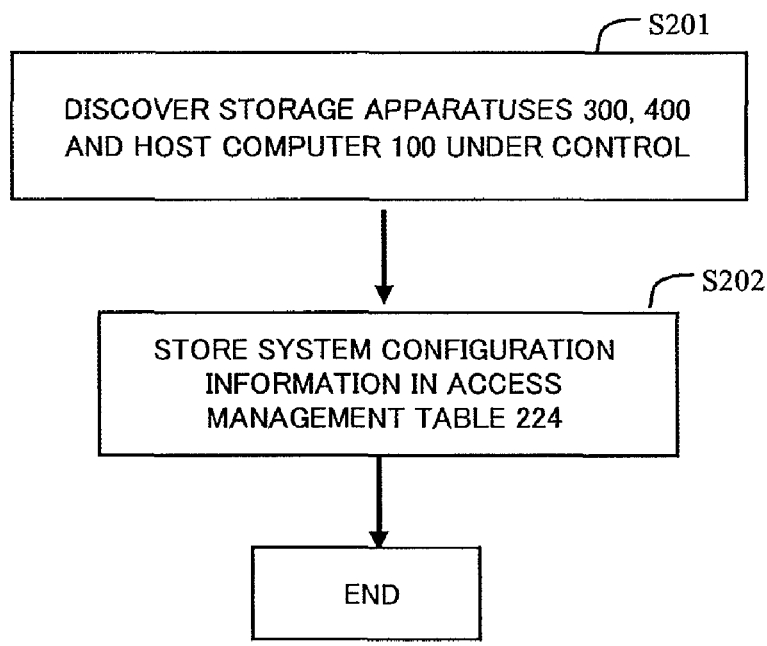
FIG. 6 shows the first mode of the processing flow by a management server.

FIG. 6 shows the details of the processing (S101) where the management server 200 stores the system configuration information of the storage apparatuses 300, 400 and the host computers 100, 101, 102 in the access management table.

At step S201, the storage management program 221 of the management server 200 discovers the storage apparatuses 300, 400 and the host computers 100, 101, 102 under its control. Subsequently, at step S202, the storage management program 221 of the management server 200 stores the information concerning the host identifier 2240, the volume identifier 2241, and the disks for composing volume 2242 in the access management table 224.

Figure 7:
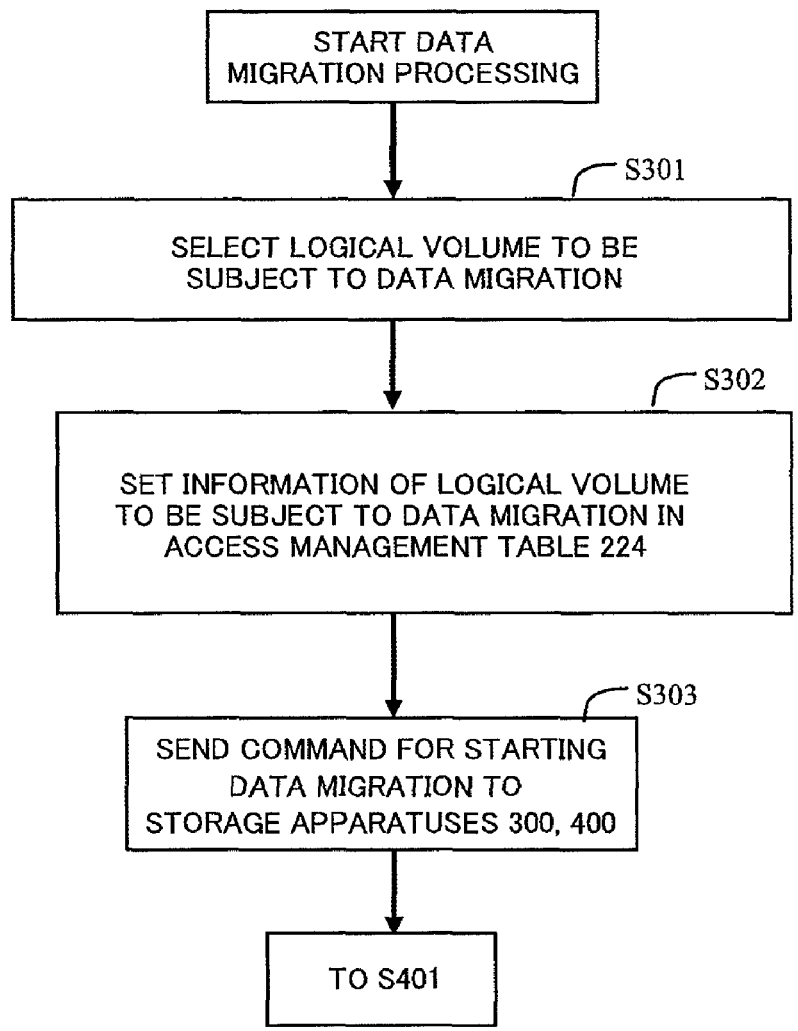
FIG. 7 shows the second mode of the processing flow by the management server.

FIG. 7 shows the details of the processing (S102) where the management server 200 sends a command to the storage apparatuses 300, 400 to start the data migration processing.

Foremost, at step S301, the volume migration management program 222 of the management server 200 selects a logical volume to be subject to data migration. Subsequently, at step S302, the volume migration management program 222 of the management server 200 sets the volume identifier and disk information of the logical volume to be subject to data migration in the migration destination volume identifier column 2243 and the migration destination disks for composing volume column 2244 of the access management table 224. Subsequently, at step S303, the migration management program 222 of the management server 200 sends a data migration start command to the volume migration program 321 of the storage apparatus 300 and the volume migration program 421 of the storage apparatus 400.

Figure 8:
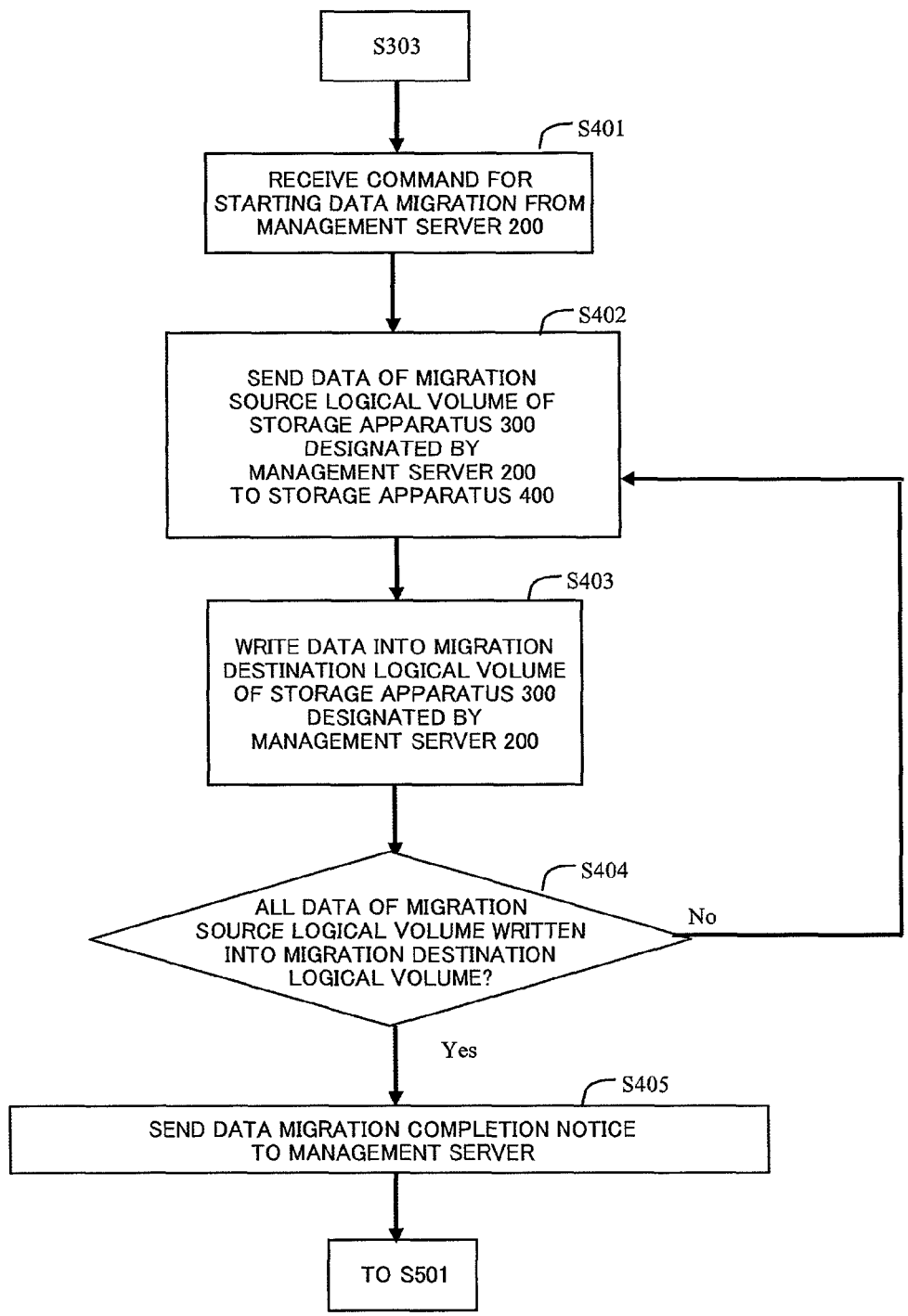
FIG. 8 shows the first mode of the processing flow by a storage apparatus.

FIG. 8 shows the details of the processing from the time the storage apparatuses 300, 400 receive the command for starting data migration processing from the management server 200 and execute data migration (S103), and send a data migration processing completion notice to the management server 200 (S104).

The processing flow shown in FIG. 8 is started when the volume migration programs 321, 421 of the storage apparatuses 300, 400 receive a data migration start command from the data migration management program 222 of the management server 200 (S401). Subsequently, at step S402, the volume migration program 321 of the storage apparatus 300 reads data from the logical volume of the migration source of the storage apparatus 300 designated by the migration management program 222 of the management server 200, and sends the read data to the storage apparatus 400 via the copy network 530. Subsequently, at step S403, the volume migration program 421 of the storage apparatus 400 writes the data received from the storage apparatus 300 into the logical volume of the migration destination of the storage apparatus 400 designated by the migration management program 222 of the management server 200. Subsequently, at step S404, the volume migration program 321 checks whether all data of the logical volume of the migration source has been written into the migration destination volume. When the writing is incomplete, the routine returns to step S401. When all data has been written, the routine proceeds to step S405. At step S405, the volume migration program 321 of the storage apparatus 300 sends a data migration processing completion notice to the management server 200.

Figure 9:
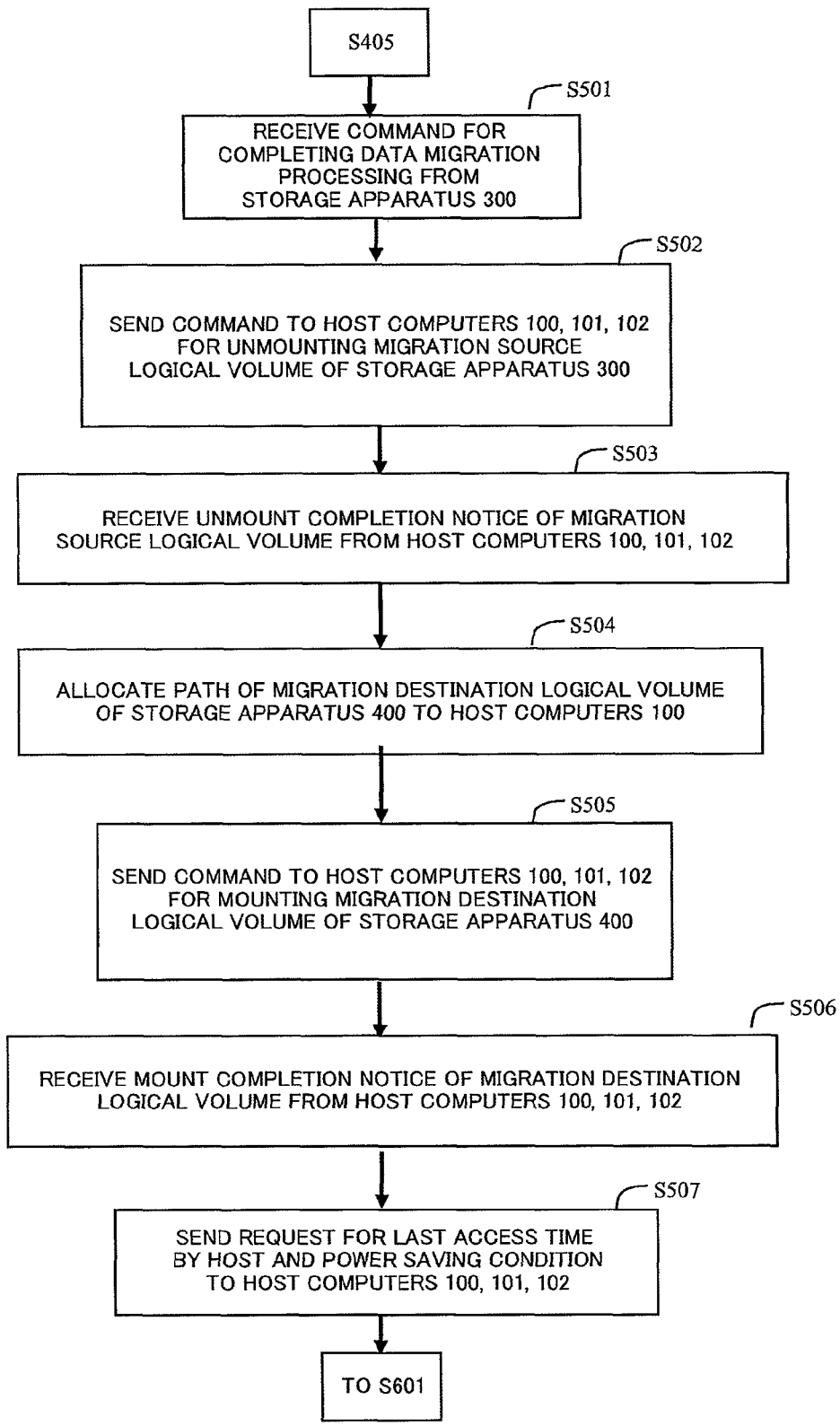
FIG. 9 shows the third mode of the processing flow by the management server.

FIG. 9 shows the details of the processing from the time the management server 200 receives a data migration processing completion notice from the storage apparatus and switches the path of the logical volumes (S105), and requests the respective host computers 100, 101, 102 for the information concerning the last access time by host and the power saving condition (S106).

The processing flow shown in FIG. 9 is started when the volume migration management program 222 of the management server 200 receives a data migration completion notice from the volume migration program 321 of the storage apparatus 300 at S501. Subsequently, at step S502, the storage management program 221 of the management server 200 sends a command to the volume manager 122 of the host computers 100, 101, 102 using the logical volumes to be subject to data migration to unmount the logical volumes of the data migration source of the storage apparatus 300. Subsequently, at step S503, the volume manager 122 of the host computers 100, 101, 102 sends an unmount completion notice of the migration source logical volume of the storage apparatus 300. Subsequently, at step S504, the storage management program 221 of the management server 200 allocates paths of the migration destination logical volume of the storage apparatus 400 to the host computers 100, 101, 102. Subsequently, at step S505, the storage management program 221 of the management server 200 sends a command to the volume manager 122 of the host computers 100, 101, 102 to mount the migration destination logical volumes of the storage apparatus 400. Subsequently, at step S506, the storage management program 221 receives a notice from the volume manager 122 of the host computers 100, 101, 102 indicating that the mount of the migration destination logical volumes is complete and the switching of the paths is complete. Incidentally, the host computers 100, 101, 102 identify logical volumes before data migration and logical volume after data migration with the same LUN 1240. Subsequently, at step S507, the storage management program 222 of the management server sends a request for information concerning the last access time by host and the power saving condition regarding the logical volumes contained in the physical disks constituting the logical volumes that were subject to data migration to the host computers 100, 101, 102 using the storage areas of the physical disks constituting the logical volumes that were subject to data migration. As described above, the last access time by host is the last time that the host computers 100, 101, 102 accessed the logical volumes of the storage apparatuses 300, 400. The power saving condition is the period from the foregoing last access time by host to the time that the state of the physical disks can be switched from a normal power consumption mode to a power saving mode. This power saving condition is decided according to the default power saving condition, and the operation schedule of applications in the host computer. The storage management program 222 refers to the information concerning the host identifier 2240, the volume identifier 2241, and the disks for composing volume 2242 stored in the access management table 224, and specifies the physical disks constituting the logical volumes that were subject to data migration and the host computer using the storage areas of such physical disks.

Figure 10:
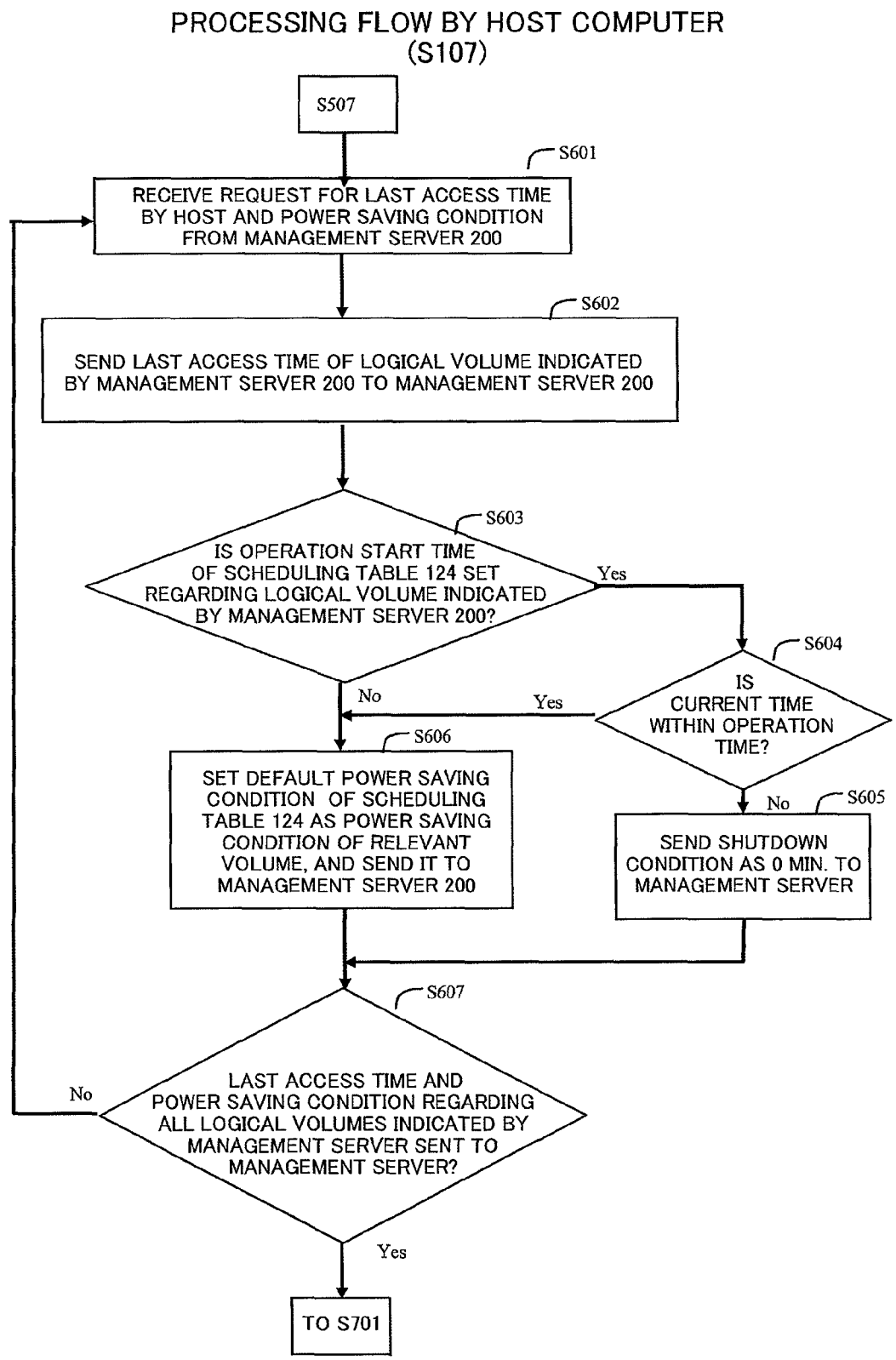
FIG. 10 shows a processing flow by a host computer.

FIG. 10 shows the details of the processing from the time the respective host computers 100, 101, 102 receive a request for information concerning the last access time by host and the power saving condition from the management server 200, and send information concerning the last access time by host and the power saving condition to the management server 200 (S107).

The processing flow shown in FIG. 10 is executed respectively by the host computers 100, 101, 102 when the agent program 121 of the respective host computers 100, 101, 102 receives a request for information concerning the last access time by host and the power saving condition from the storage management program 222 of the management server 200 (S601). At step S602, the agent program 121 of the host computers 100, 101, 102 refers to the update information of files of the operating system 123 according to the request from the storage management program 221, acquires information concerning the last access time regarding the logical volumes requested by the storage management program 221, and sends such information to the storage management program 221 of the management server 200. Subsequently, at step S603, the agent program 121 checks whether the operation start time of the scheduling table 124 has been set regarding the logical volumes requested by the storage management program 221. When the operation start time has been set, the routine proceeds to step S604. When the operation start time has not been set, the routine proceeds to step S606. At step S604, the agent program 121 additionally checks whether the current time is within the operation time. When the current time is within the operation time, the routine proceeds to step S606. When the current time is not within the operation time, the routine proceeds to step S605. At step S606, the agent program 121 sets the default power saving condition 1245 of the scheduling table 124 as the power saving condition of the logical volumes, sends the information designated as the power saving condition to the storage management program 221 of the management server 200, and then proceeds to step S607. At step S605, the agent program 121 sets the power saving condition to 0 minutes, sends the power saving condition to the storage management program 221 of the management server 200, and then proceeds to step S607. Subsequently, at step S607, the agent program 121 checks whether the last access time by host and the power saving condition regarding all logical volumes requested by the storage management program 221 of the management server 200 have been sent to the management server 200. When the last access time by host and the power saving condition regarding all logical volumes have been sent, the routine proceeds to step S701. When there is a logical volume that has not been sent, the routine returns to step S601.

Figure 11:
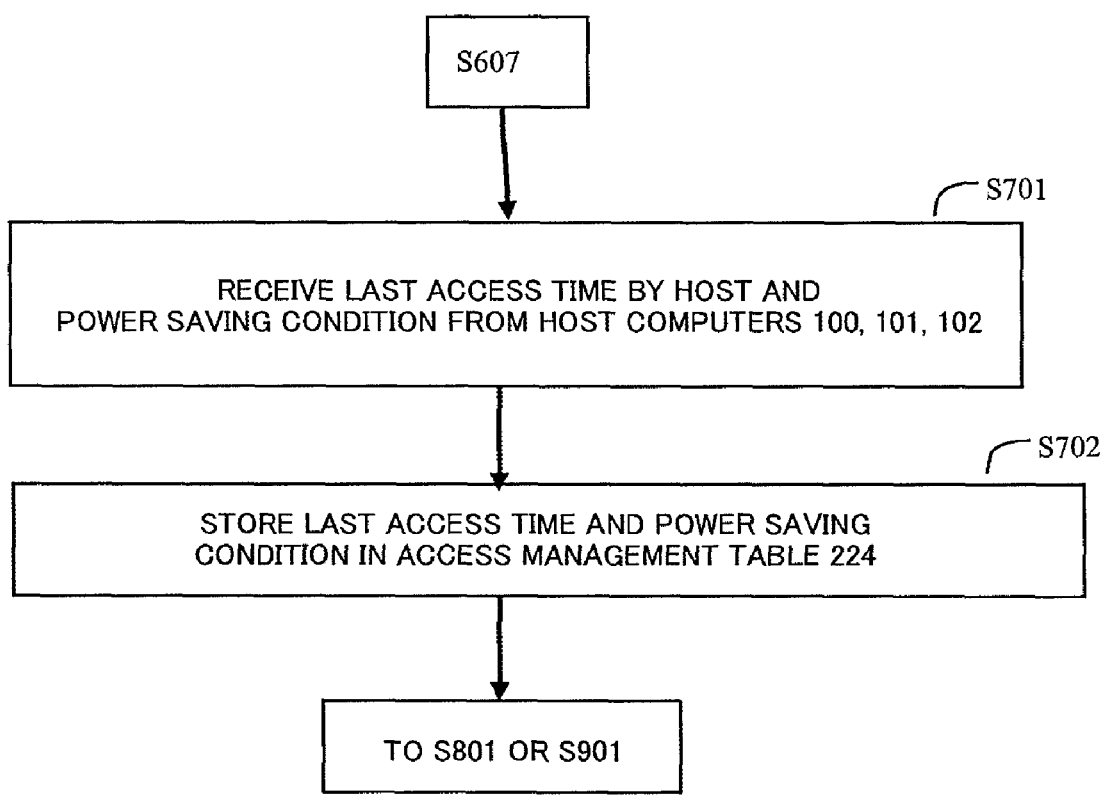
FIG. 11 shows the fourth mode of the processing flow by the management server.

FIG. 11 shows the processing from the time the management server 200 receives information concerning the last access time by host and the power saving condition from the host computers 100, 101, 102, and stores such information in the access management table 224 (S108).

At step S701, the storage management program 221 of the management server 200 receives the information concerning the last access time by host and the power saving condition requested at step S507 from the agent program 121 of the respective host computers 100, 101, 102. Subsequently, at step S702, the storage management program 221 of the management server 200 stores the received last access time by host and the power saving condition in the last access time by host 2245 and the power saving condition 2246 of the access management table 224.

Figure 12:
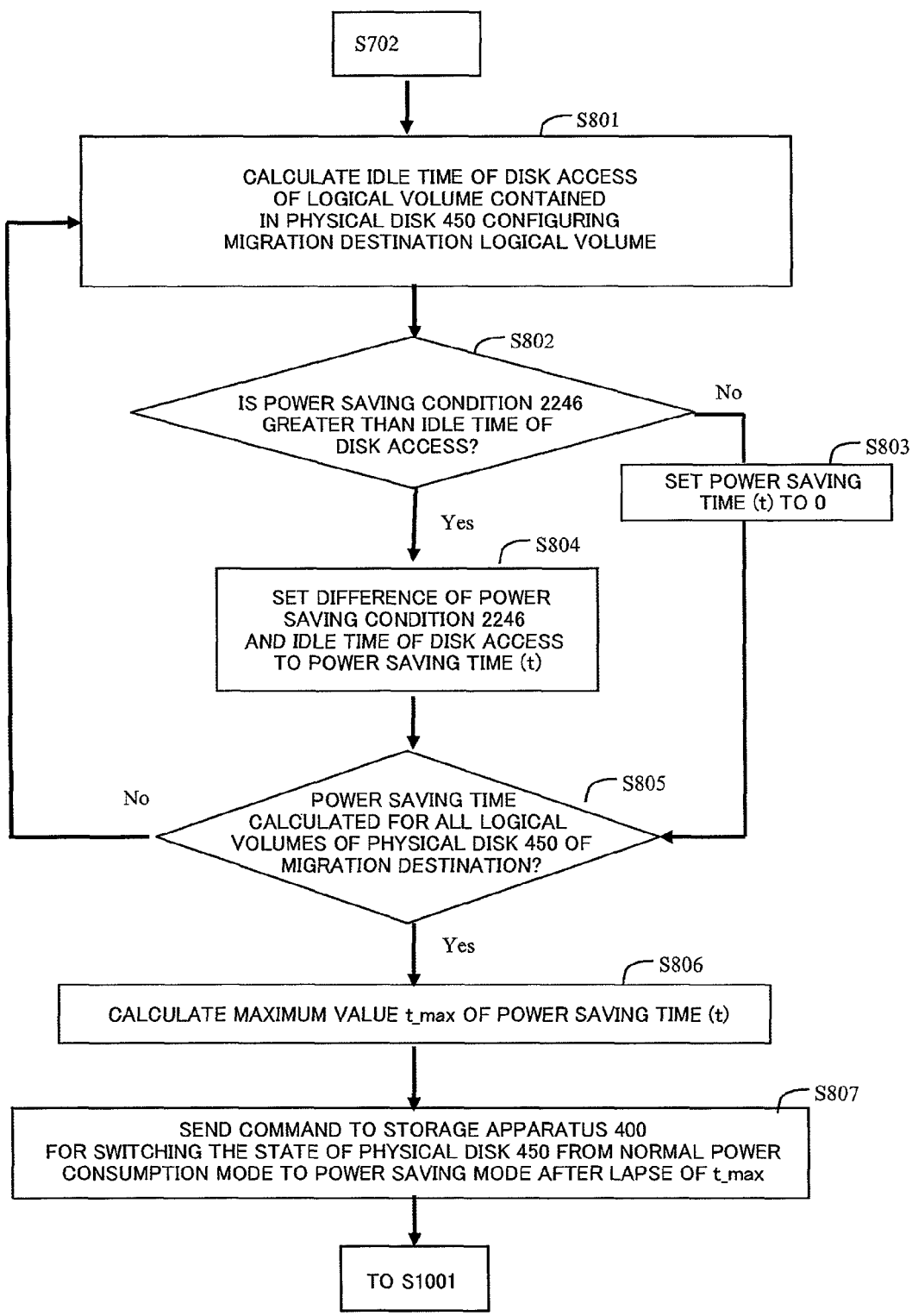
FIG. 12 shows the fifth mode of the processing flow by the management server.
Figure 13:
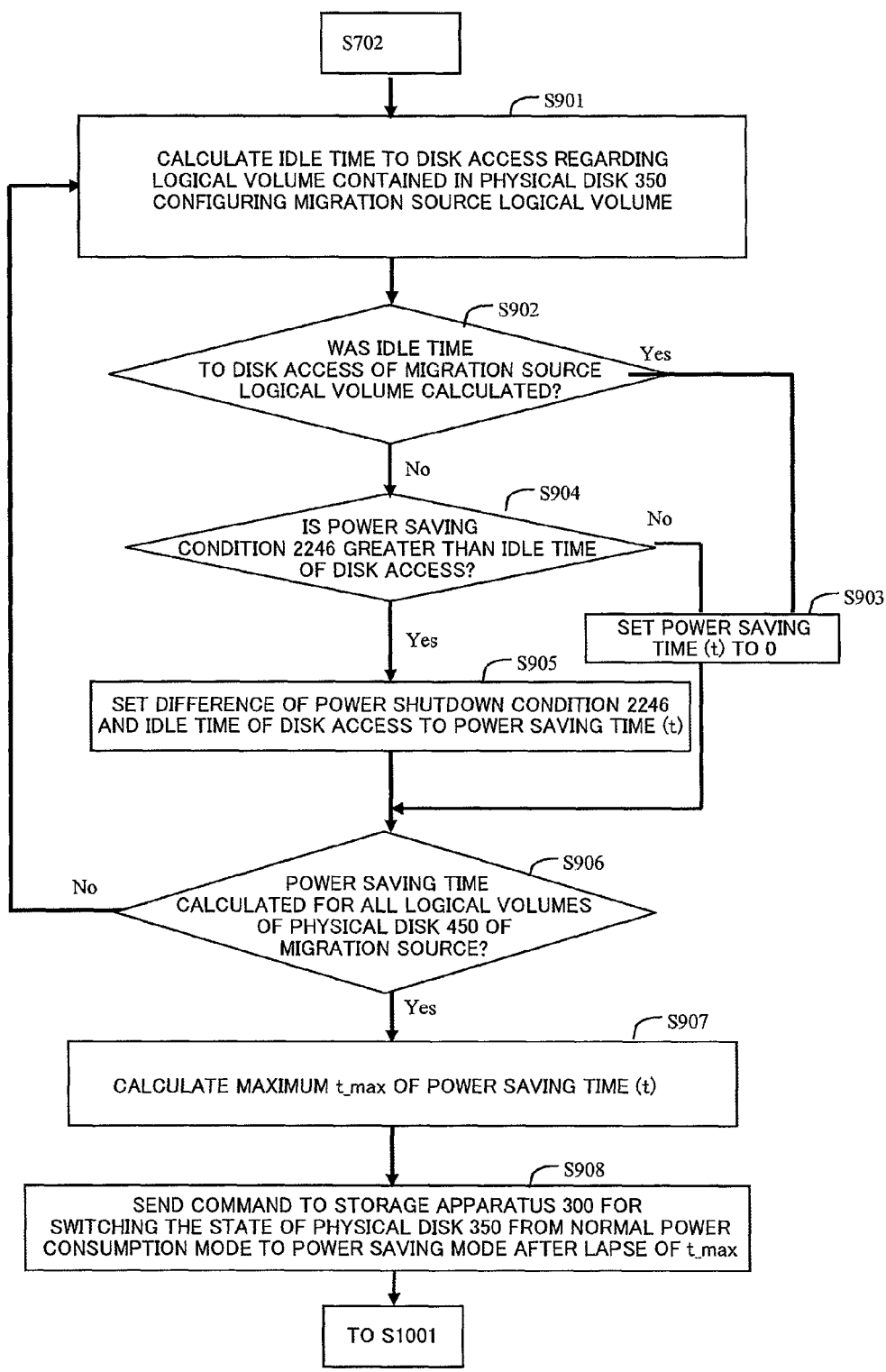
FIG. 13 shows the sixth mode of the processing flow by the management server.

FIG. 12 and FIG. 13 show details in a case of the physical disks 450 of the migration destination regarding the processing of using information of the access management table to determine whether to switch the state of the physical disks from a normal power consumption mode to a power saving mod (S109), and sending a command to the storage apparatus 400 to switch the state of the physical disks from a normal power consumption mode to a power saving mode according to the determination result (S110). The processing shown in FIG. 12 is the processing of the management server 200 to be performed regarding the physical disks containing the migration destination logical volumes, and the processing shown in FIG. 13 is the processing of the management server 200 to be performed regarding the physical disks containing the migration source logical volumes. Incidentally, the term "power saving time" used below refers to the period from the current time to the time that the state of the physical disks can be switched from a normal power consumption mode to a power saving mode.

Foremost, at step S801, the power management program 223 of the management server 200 calculates the elapsed time (hereinafter referred to as the "idle time of disk access") from the last access time by host 2245 of the access management table to the current time regarding the logical volumes contained in the physical disks constituting the migration destination logical volumes, and stores this in the memory of the management server. Subsequently, at step S802, the power management program 223 compares the power saving condition 2246 of the access management table 224 and the calculated idle time of disk access. When the power saving condition 2246 is shorter than the calculated idle time of disk access, the routine proceeds to step S803, and when the power saving condition 2246 is longer than the calculated idle time of disk access, the routine proceeds to step S804. At step S803, the power management program 223 sets the power saving time which is the period from the current time to the time that the physical disks can be migrated to the power saving mode to 0 minutes, and then proceeds to step S805. At step S804, the power management program 223 sets the difference between the power saving condition 2246 and the calculated idle time of disk access as the power saving time, and proceeds to step S805. At step S805, the power management program 223 checks whether the power saving time of all logical volumes contained in the physical disks constituting the data migration destination logical volumes has been calculated. If the power saving time of all logical volumes has been calculated, the routine proceeds to step S806. When the power saving time of all logical volumes has not been calculated, the routine returns to step S801. Subsequently, at step S806, the power management program 223 calculates the maximum value (t_max) among the power saving times (t) calculated regarding a plurality of logical volumes contained in the physical disks constituting the data migration destination logical volumes. Subsequently, at step S807, the power management program 223 sends a command to the power control program 422 of the storage apparatus 400 of the data migration destination to switch the state of the physical disks containing the data migration destination logical volumes from a normal power consumption mode to a power saving mode after the lapse of t_max. Incidentally, at step S807, the command may be sent upon adding an attribute from the power management program 223 of the management server to the power control program 422 of the storage apparatus 400 of switching the state of the physical disks corresponding to the logical volumes of the data migration destination from a normal power consumption mode to a power saving mode after the lapse of t_max.

Like this, by seeking the power saving time (perform from the current time to the time the state of the physical disks can be switched from a normal power consumption mode to a power saving mode) regarding the each of the plurality of logical volumes contained in the physical disks, and controlling the physical disks according to the longest time among the plurality of power saving times sought regarding the respective logical volumes, it is possible to prevent obstructing the access to the plurality of logical volumes contained in the physical disks.

Meanwhile, FIG. 13 shows details in the case of the physical disks 350 of the migration source regarding the processing of determining whether to switch the state of the physical disks from a normal power consumption mode to a power saving mode (S109), and sending a command to the storage apparatus 400 to switch the state of the physical disks from a normal power consumption mode to a power saving mode according to the determination result (S110). Foremost, at step S901, the power management program 223 of the management server 200 calculates the idle time of disk access regarding the logical volumes contained in the physical disks constituting the migration source logical volumes. Subsequently, at step S902, the power management program 223 checks whether the target of calculating the idle time of disk access is the migration source logical volume. When the target of calculating the idle time of disk access is the migration source logical volume, the routine proceeds to step S903. When the target of calculating the idle time of disk access is not the migration source logical volume, the routine proceeds to step S904. At step S903, the power saving time corresponding to that logical volume is set to 0, and the routine proceeds to step S906. At step S904, the power management program 223 compares the power saving condition 2246 of the access management table 224 and the idle time of disk access. When the power saving condition 2246 is longer than the idle time of disk access, the routine proceeds to step S905, and when the power saving condition 2246 is shorter than the idle time of disk access, the routine proceeds to step S903, the power saving time is set to 0, and then the routine proceeds to S906. At step S905, the difference between the power saving condition 2246 and the idle time of disk access is set as the power saving time corresponding to that logical volume, and the routine proceeds to step S906. At step S906, the power management program S906 checks whether the power saving time of all logical volumes contained in the physical disks constituting the data migration source logical volumes has been calculated. If the power saving time of all logical volumes has been calculated, the routine proceeds to step S907. If the power saving time of all logical volumes has not been calculated, the routine returns to step S901. At step S907, the power management program 223 calculates the maximum value (t_max) of the power saving time (t). Subsequently, at step S908, the power management program 223 sends a command to the power control program 422 of the storage apparatus 300 to switch the state of the physical disks from a normal power consumption mode to a power saving mode after the lapse of t_max.

Figure 14:
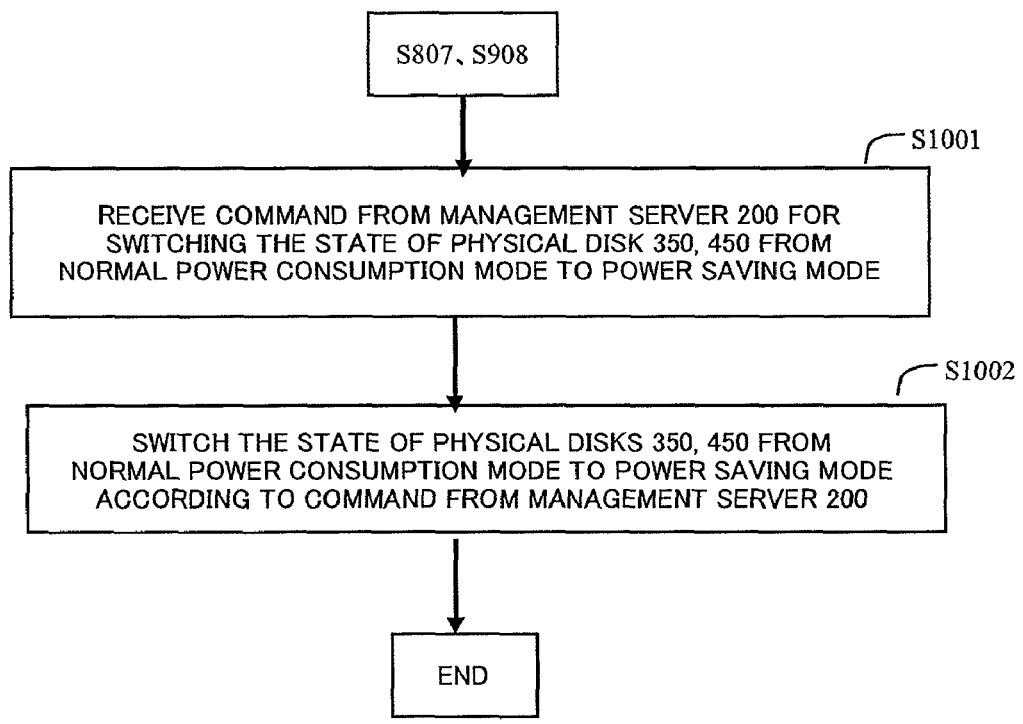
FIG. 14 shows the second mode of the processing flow by the storage apparatus.

FIG. 14 shows the details of the processing (S111) where the storage apparatuses 300, 400 switch the state of the physical disks from a normal power consumption mode to a power saving mode according to a command from the management server 200.

At step S1001, the power control programs 322, 422 of the storage apparatuses 300, 400 receive a command from the power management program 223 of the management server 200 to switch the state of the physical disks from a normal power consumption mode to a power saving mode. Subsequently, at step S1002, the power control programs 322, 422 switch the state of the physical disks designated by the power management program 223 from a normal power consumption mode to a power saving mode according to the command received from the power management program 223.

In this embodiment, access from the host computer and access based on processing for managing the storage apparatus are differentiated, and, by controlling the physical disks according to the access from a host computer, it is possible to seek the reduction in the amount of power consumption of the storage apparatus. Further, by controlling the physical disks corresponding to the logical volumes of the data migration destination through use of the last access time by host to the logical volume of the data migration source and the power saving condition, the state of the physical disks can be switched from a normal power consumption mode to a power saving mode at a more appropriate timing, and it is thereby possible to avoid and reduce unnecessary power consumption.

Incidentally, in this embodiment, as an example of processing for managing the storage apparatus, although a case was explained regarding data migration processing between logical volumes to be executed by the volume migration management program 222 of the management server 200 coordinating with the volume migration programs 321, 421 of the storage apparatuses 300, 400, processing for managing the storage apparatus is not limited to data migration processing. Processing for managing the storage apparatus, for instance, may additionally be processing of accessing physical disks of a power saving mode at prescribed intervals in order to diagnose the occurrence of a failure, or copy processing between logical volumes.

A case of performing copy processing between logical volumes is now explained as an application of this embodiment with reference to FIG. 15 through FIG. 20.

Figure 15:
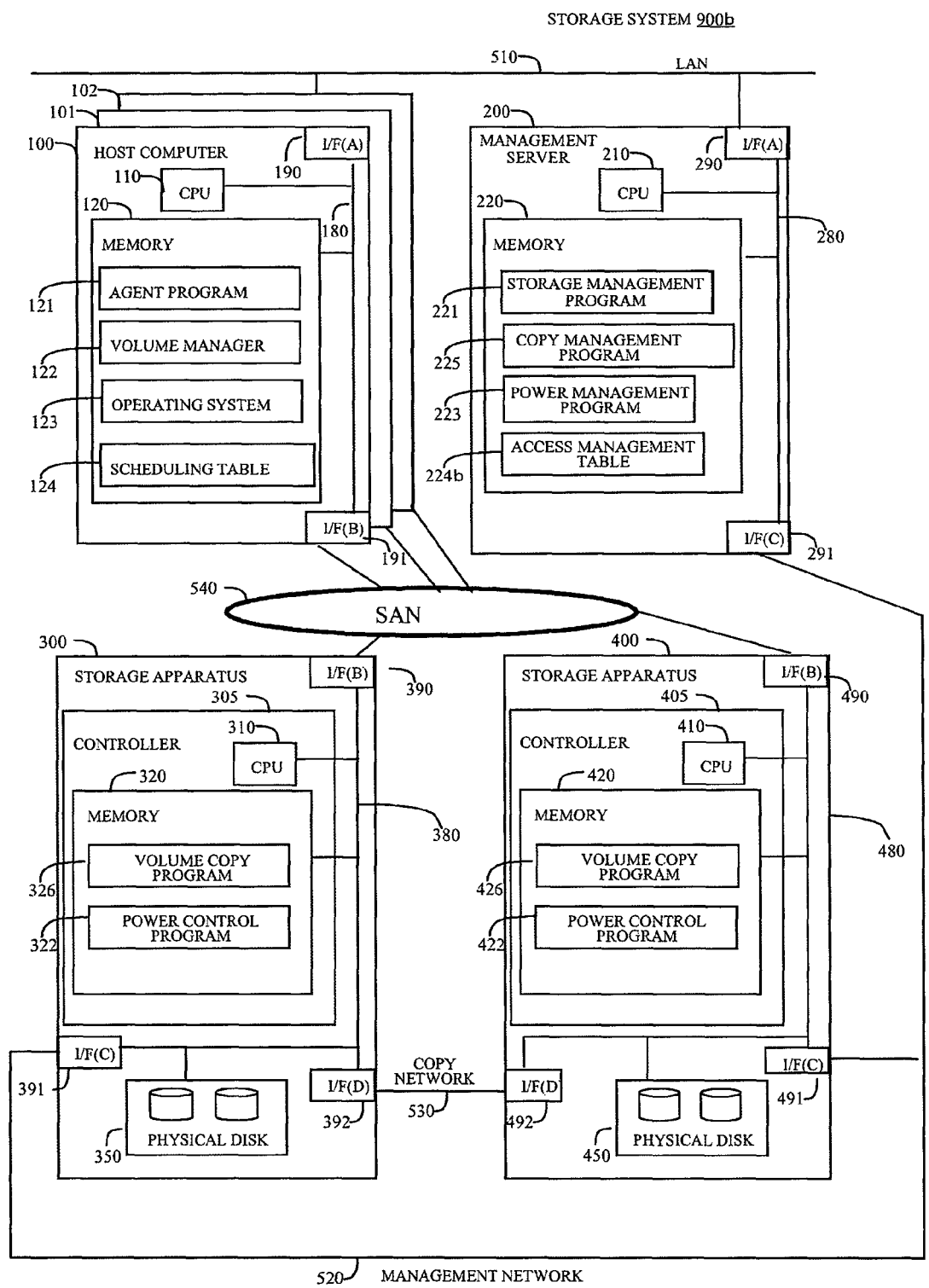
FIG. 15 shows the second mode of a system configuration.

FIG. 15 is a diagram showing the configuration of a storage system 900b as an application of the storage system 900 shown in FIG. 1. Although a case of performing data migration processing was explained with the storage system 900 of FIG. 1, a case of implementing copy processing is explained with the storage system 900b shown in FIG. 15. This storage system 900b comprises a plurality of host computers 100, 101, 102, a management server 200, and storage apparatuses 300, 400. This configuration is basically the same as the configuration of the storage system 900 shown in FIG. 1. The difference from the storage system 900 shown in FIG. 1 is that certain information of the access management table 224b in the memory 220 of the management server 200 is different, and that a copy management program 225 is provided instead of the volume migration management program 222. Further, the memories 320, 420 of the storage apparatuses 300, 400 contain volume copy programs 326, 426 and not volume migration programs 321, 421. FIG. 16 shows the details of the access management table 224b. As shown in FIG. 16, the access management table 224b differs from the access management table 224 of FIG. 1 in that the columns of the migration destination volume identifier 2243 and disks for composing volume of migration destination 2244 are respectively changed to copy destination volume identifier 2243b and disks for composing volume of copy destination 2244b. The copy management program 225 of the management server 200 is a program for managing the copy processing of a plurality of storage apparatuses. The volume copy programs 326, 426 of the storage apparatuses 300, 400 are programs for executing the copy processing of the storage apparatuses 300, 400.

Figure 17:
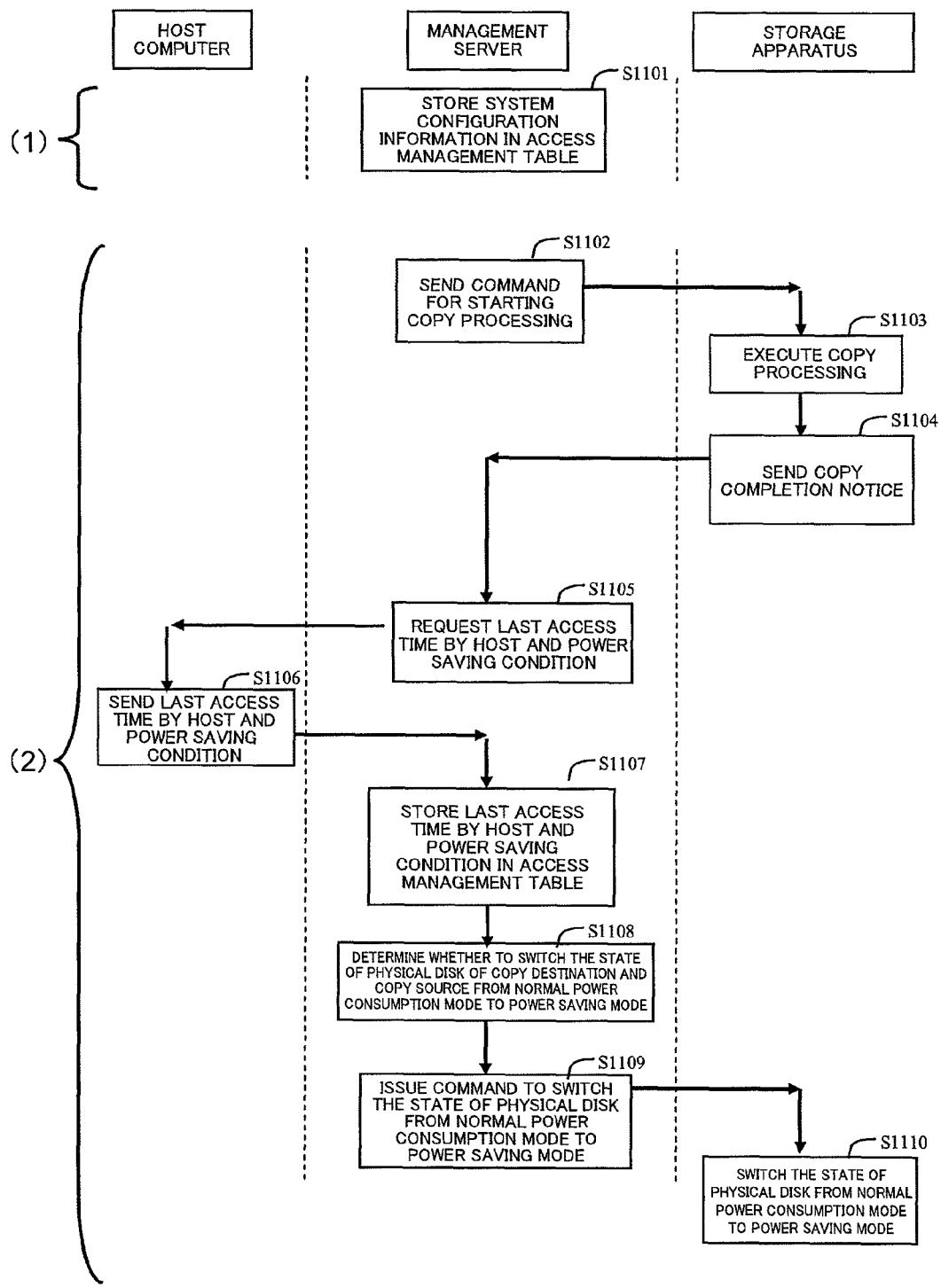
FIG. 17 shows the second mode of the overall processing flow.

The processing to be performed by the storage system 900b shown in FIG. 15 is now explained with reference to FIG. 17. The processing shown in FIG. 17(1) is the processing for performing the initial setting of the storage system 900b, and the processing shown in FIG. 17(2) is the processing in a case where copy processing between logical volumes arises in the storage system 900b. The difference in FIG. 5 showing the processing of implementing data migration processing in the storage system 900 of FIG. 1, and FIG. 17 is in that the migration processing start S102 of FIG. 5 is changed to copy processing start S1102, the migration processing execution S103 of FIG. 5 is changed to copy processing execution S1103, the path switch processing S104 of FIG. 5 does not exist, and the determination of whether to switch the state of the physical disks from a normal power consumption mode to a power saving mode shown in S1108 of FIG. 17 is different from the determination of whether to switch the state of the physical disks from a normal power consumption mode to a power saving mode shown in S109 of FIG. 5. The details will be explained later.

In the case of copy processing, even after the copy processing is complete, the path of the copy source logical volume and the host computer exists. In other words, even after the completion of copy processing, access from the host computer to the copy source logical volume will arise. Thus, just because the copy processing is complete, the state of the physical disks containing the copy source logical volumes cannot be immediately switched from a normal power consumption mode to a power saving mode. Thus, the determination on whether to switch the state of the physical disks from a normal power consumption mode to a power saving mode partially differs from the case of data migration processing.

Foremost, at step S1101, as with the case of data migration processing in the storage system 900 of FIG. 1, the management server stores system configuration information in the access management table 224b based on the processing of the storage management program 221.

Subsequently, at step S1102, the management server sends a command to the storage apparatuses 300, 400 to start copy processing based on the processing of the copy management program 225.

Figure 18:
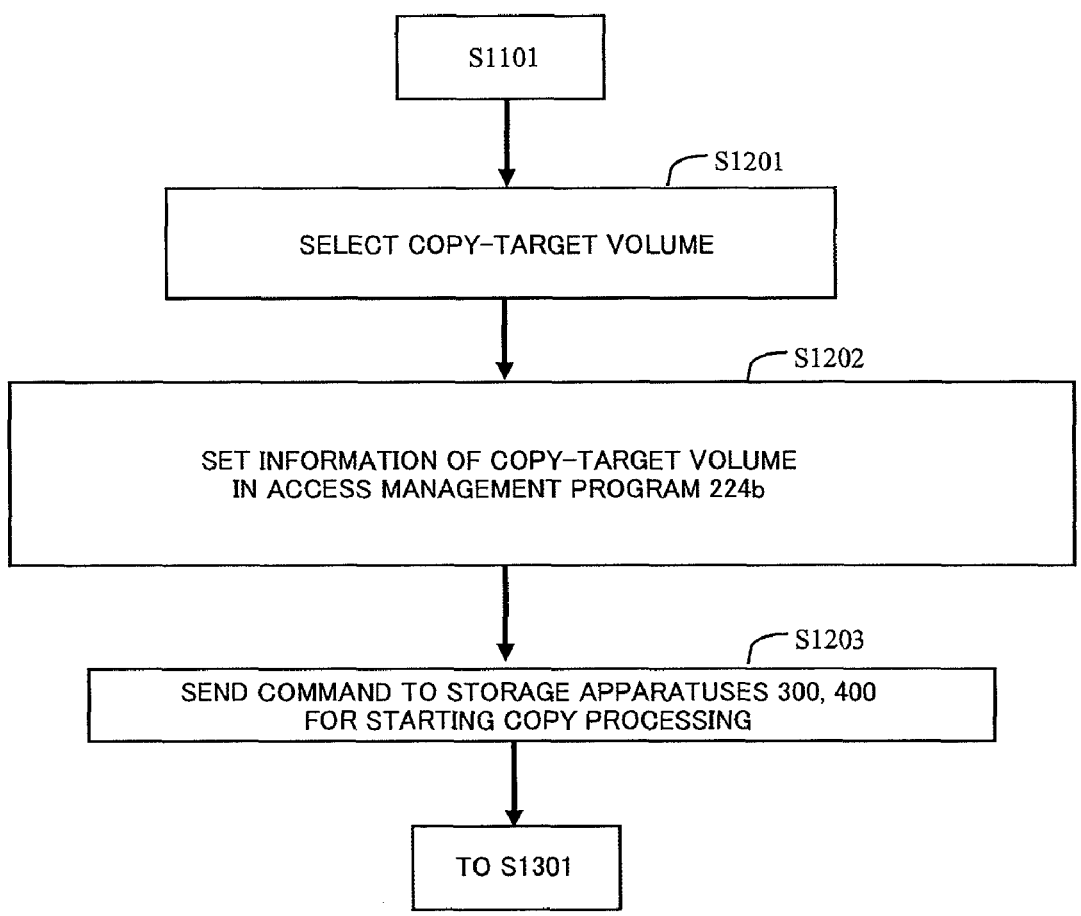
FIG. 18 shows the seventh mode of the processing flow by the management server.

FIG. 18 shows the details of step S1102. Foremost, at step S1201, the copy management program 225 of the management server 200 selects the logical volume to be copied. At step S1202, the copy management program 225 of the management server 200 sets the volume identifier and disk information of the logical volume to be copied in the copy destination volume identifier column 2243b and the copy destination disks for composing volume column 2244b of the access management table 224b. At step S1203, the copy management program 225 of the management server 200 sends a command to the volume copy program 326 of the storage apparatuses 300, 400 and the volume copy program 426 of the storage apparatus 400 to start copy processing.

Subsequently, at step S1103 and step S1104 of FIG. 17, the storage apparatuses 300, 400 that received the command of copy processing start execute copy processing based on the processing of the volume copy programs 326, 426, and send a copy processing completion notice to the management server 200.

Figure 19:
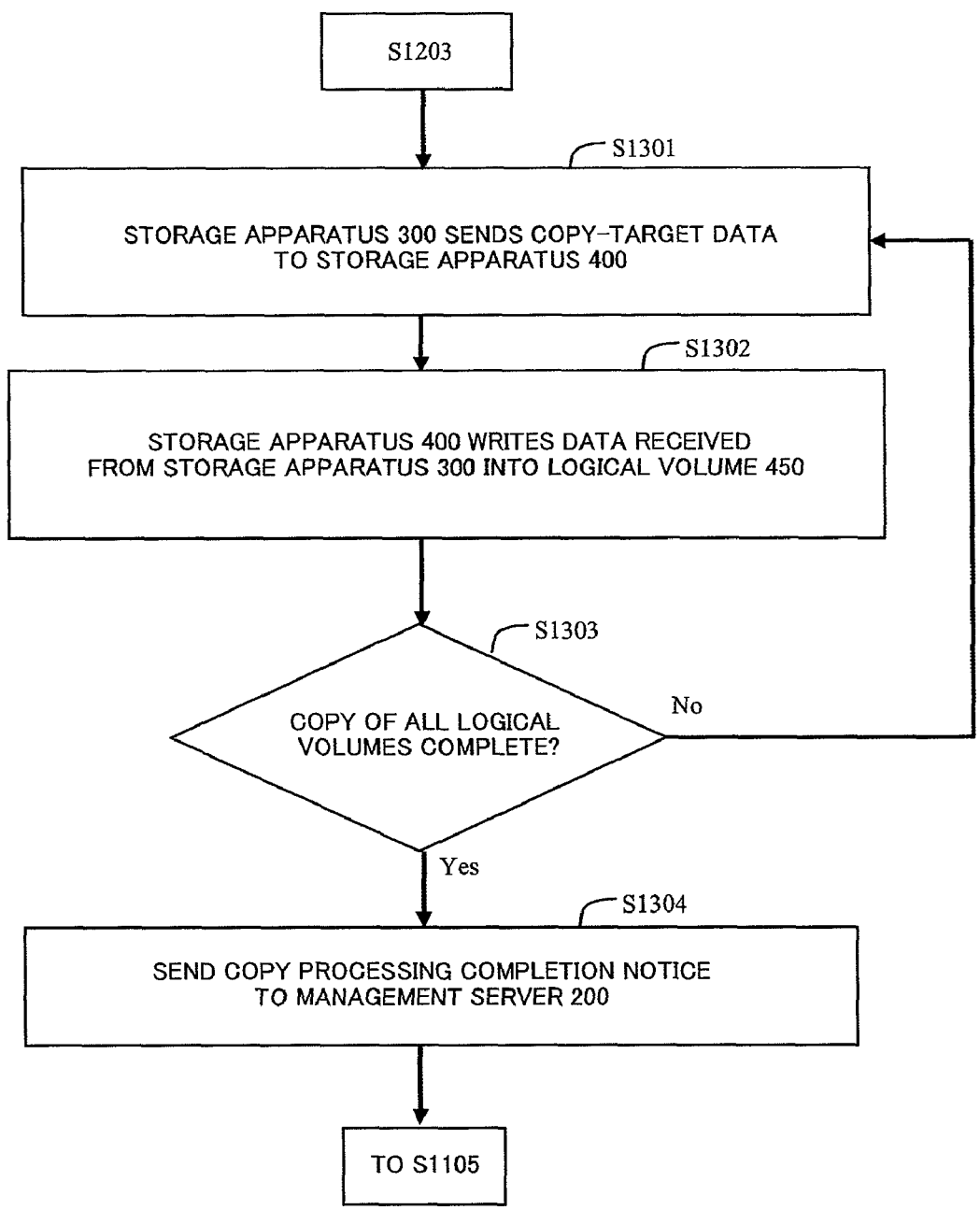
FIG. 19 shows the third mode of the processing flow by the storage apparatus.

Details of step S1103 and step S1104 are now explained with reference to FIG. 19. Foremost, at step S1301, the storage apparatus 300 that received the command of copy processing start sends the data of the copy source logical volume designated by the copy management program 225 of the management server 200 to the storage apparatus 400 containing the copy destination logical volume based on the processing of the volume copy program 326. Subsequently, at step S1302, the storage apparatus 400 writes the data received from the storage apparatus 300 based on the processing of the volume copy program 426 into the copy destination logical volume designated by the copy management program 225 of the management server 200. At step S1303, the storage apparatuses 300, 400 determine whether the copy processing of all logical volumes designated by the copy management program 225 of the management server 200 is complete based on the processing of the volume copy programs 326, 426. When the copy processing of all logical volumes is complete, the routine proceeds to step S1304, and when the copy processing of all logical volumes is not complete, the routine returns to step S1301. At step S1304, the volume copy program 325 of the storage apparatus 300 sends a copy processing completion notice to the management server 200.

Subsequently, at steps S1105, S1106 and S1107 of FIG. 17, the management server 200 that received the copy completion notice from the storage apparatus 300, as with the case of data migration processing in the storage system 900 of FIG. 1, acquires the last access time by host and the power saving condition regarding all logical volumes configured from the physical disks containing the logical volume to be copied from the host computer based on the processing of the storage management program 221, and stores these in the access management table 224b of the management server 200.

At step S1108 of FIG. 17, the management server 200 determines whether to switch the state of the physical disks 350 containing the copy source logical volume and the state of the physical disks 450 containing the copy destination logical volume from a normal power consumption mode to a power saving mode. Further, at step S1109, the management server sends a command to the storage apparatuses 300, 400 according to the determination result.

Figure 20:
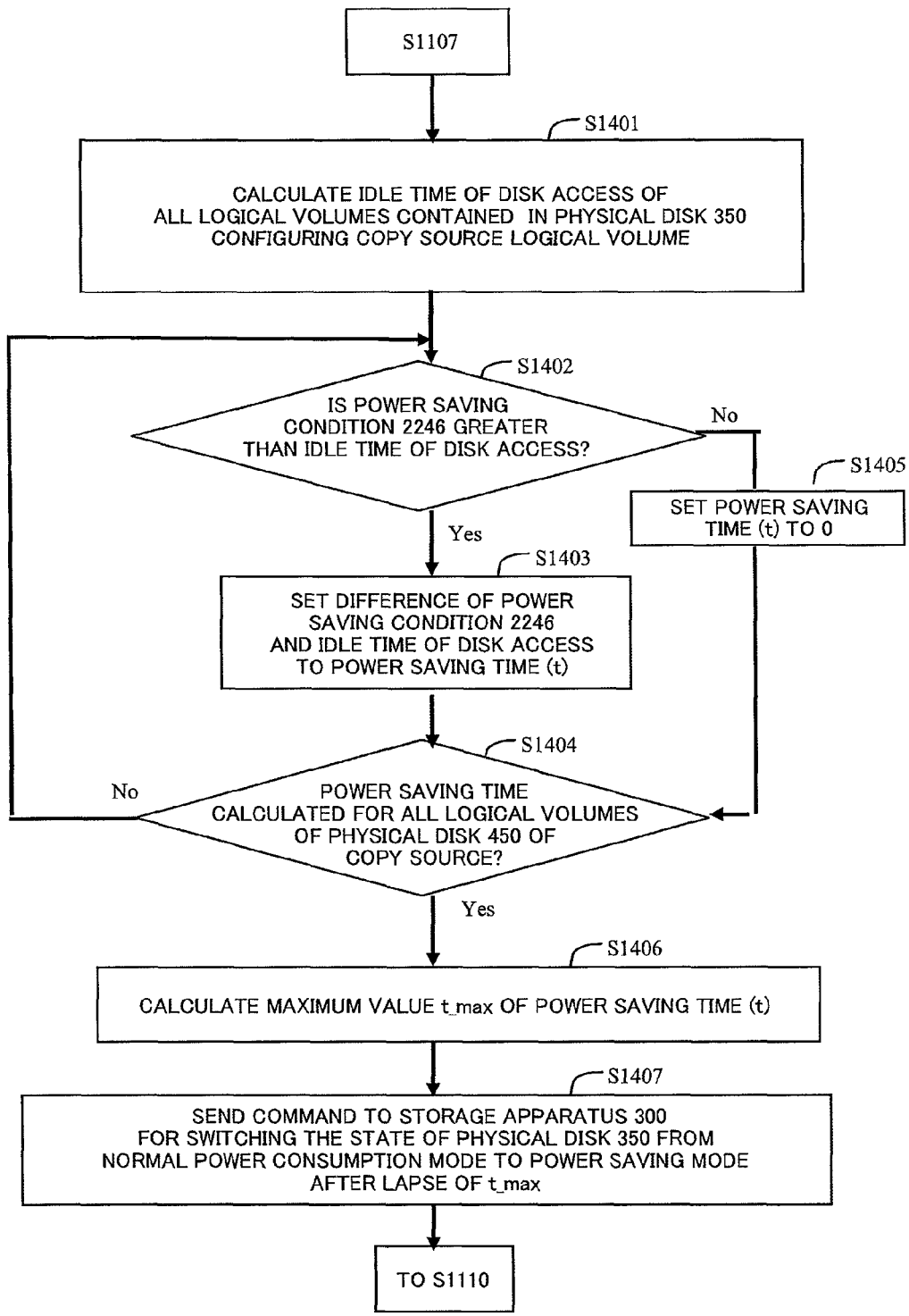
FIG. 20 shows the eighth mode of the processing flow by the management server.

Details of step S1108 and step S1109 are now explained with reference to FIG. 20. FIG. 20 shows the flow of determining whether to switch the state of the physical disks 350 of the storage apparatus 300 containing the copy source logical volume from a normal power consumption mode to a power saving mode, and sending a command to the storage apparatus 300 according to the determination result. Foremost, at step S1401, the power management program 223 of the management server 200 refers to the current time and the last access time by host 2245 of the access management table 224 regarding all logical volumes in the physical disks 350 containing the copy source logical volume, and calculates the idle time to disk access, which is the elapsed period from the last access from the host computers 100, 101, 102 to the current time. Subsequently, at step S1402, the power management program 223 of the management server 200 determines whether the power saving condition 2246 of the access management table 224b is longer than the idle time to disk access regarding the respective logical volumes in which the idle time of disk access was calculated. When the power saving condition 2246 is longer, the routine proceeds to step S1403, and the difference between the power saving condition 2246 and the idle time to disk access is set as the power saving time (t). When the power saving condition 2246 is shorter, the routine proceeds to step S1405, and sets the power saving time (t) to 0. At step S1404, the power management program 223 of the management server 200 determines whether the power saving time regarding all logical volumes in the copy source physical disks 350 has been calculated. If the calculation is incomplete, the routine returns to step S1402, and if the calculation is complete, the routine proceeds to step S1406. Subsequently, at step S1406, the power management program 223 of the management server 200 seeks the maximum value t_max among the power saving times (t) calculated regarding the logical volumes in the copy source physical disks 350. At step S1407, a command is sent to the storage apparatus 300 to switch the state of the physical disks 350 from a normal power consumption mode to a power saving mode after the lapse of maximum value t_max.

The processing regarding the physical disks 350 containing the copy source logical volume was described above. With respect to the physical disks 450 containing the copy destination logical volume, the power management program 223 of the management server 200 performs the same processing.

Unlike the data migration processing in the storage system 900 of FIG. 1, in the case of copy processing, after the completion of copy processing, the copy source logical volume will also be accessed as with the copy destination logical volume. Thus, it is necessary to perform the same processing as with the other logical volumes to the copy source logical volume without setting the power saving time (t) to 0. In the case of copy processing, the management program 223 of the management server 200 may perform processing to the copy destination physical disks 450 that is the same as the processing to be performed to the copy source physical disks 350.

Subsequently, at step S1110 of FIG. 17, the storage apparatuses 300, 400 switch the state of the instructed physical disks from a normal power consumption mode to a power saving mode according to the command from the management server 200.

According to the foregoing processing, it is possible to perform power saving control of the physical disks according to the access from the host computer to the physical disks.

Figure 21:
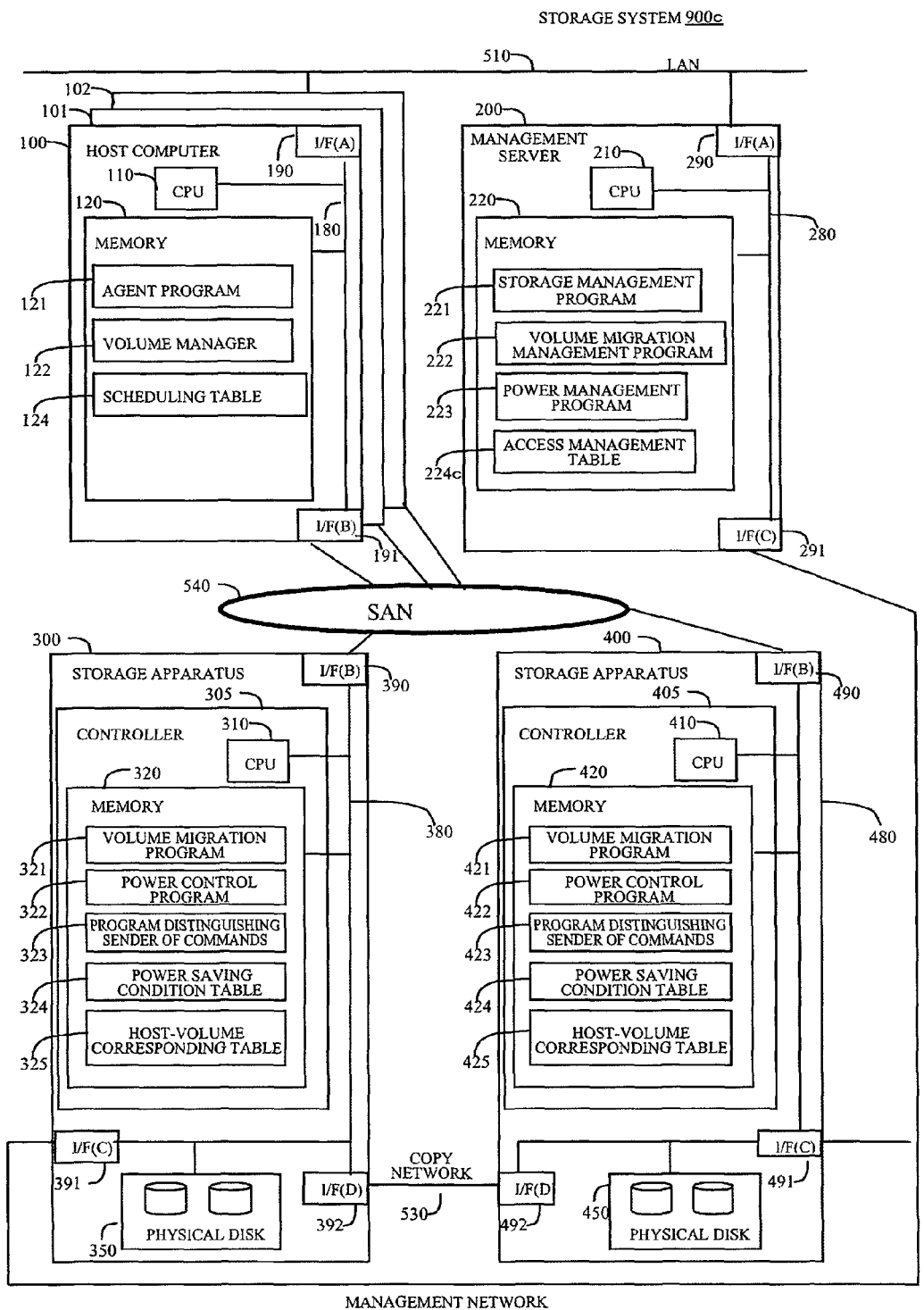
FIG. 21 shows the third mode of a system configuration.

FIG. 21 is a diagram showing the configuration of a storage system 900c as an application of the storage system 900 shown in FIG. 1. This storage system 900c comprises a plurality of host computers 100, 101, 102, a management server 200, and storage apparatuses 300, 400. In the storage system 900 shown in FIG. 1, a case was explained where the determination of whether to switch the state of the physical disks from a normal power consumption mode to a power saving mode is made by the management server 200. With the storage system 900c shown in FIG. 21, a case is explained where the determination of whether to switch the state of the physical disks from a normal power consumption mode to a power saving mode is made based on the processing of the storage apparatus including the respective physical disks.

The difference from the storage system 900 shown in FIG. 1 is that the operating system for managing the I/O is not shown in the memory 120 of the host computers 100, 101, 102, information in the access management table 224c of the memory 220 of the management server 200 is partially different from the information in the access management table 224 of FIG. 1, and the memories 320, 420 of the storage apparatuses 300, 400 include programs for distinguishing sender of commands 323, 423, power saving condition tables 324, 424, and host-volume correspondence tables 325, 425. The remaining configuration is the same as the configuration of the storage system 900 of FIG. 1.

Details of the access management table 224c of the management server are now explained with reference to FIG. 22. As shown in FIG. 22, the access management table 224c of FIG. 21 differs from the access management table 224 of FIG. 1 in that the columns of last access time by host 2245 and the power saving condition 2246 have been deleted, and a column of time to save power 2247 has been added. This time to save power 2247 decreases pursuant to the lapse of time, and, when the value becomes 0, this means that the state of the physical disks containing the corresponding logical volume may be switched from a normal power consumption mode to a power saving mode. The access management table 224c stores information concerning all logical volumes under the control of the management server 200. Further, the time to save power 2247 of the access management table 224c is information acquired from the storage apparatuses 300, 400 based on the processing of the storage management program 221.

The programs for distinguishing sender of commands 323, 423 of the storage apparatuses 300, 400 are programs for distinguishing the access from the host computers 100, 101, 102 to the logical volume of the storage apparatuses 300, 400 and the access to the logical volume arising based on the processing for storage management without going through the host computers 100, 101, 102. The storage apparatuses 300, 400 distinguish the source of the received I/O based on the processing of the programs for distinguishing sender of commands 323, 423, and, upon receiving I/O from the host computers 100, 101, 102, it resets the time to save power 3245 of the power saving condition table 324 to the default power saving conditions 3244, 4244.

The power saving condition tables 324, 424 of the storage apparatuses 300, 400 are tables to be used by the power control program 322 of the storage apparatus to determine which the state of physical disk can be switched from a normal power consumption mode to a power saving mode. Information in the power saving condition tables 324, 424 is updated based on the programs for distinguishing sender of commands 323, 423 and the power control programs 322, 422. The power saving condition tables 324, 424 respectively store information concerning the logical volumes of the storage apparatuses 300, 400.

Details of the power saving condition table 324 are now explained with reference to FIG. 23. As shown in FIG. 23, the power saving condition tables 324, 424 include six columns; namely, a volume identifier 3240 as an identifier of logical volumes to be recognized by the storage apparatuses 300, 400, disks for composing volume 3241, an operation start time 3242 showing the start time of the operation of applications of the host computers 100, 101, 102 using logical volumes, an operation end time 3243 showing the end time of the applications of the host computers 100, 101, 102 using logical volumes, a default power saving condition 3244 showing a prescribed period from the last access from the host computer to the logical volume to the time that the state of the physical disks can be switched from a normal power consumption mode to a power saving mode, and a time to save power 3245 showing the period from the current time to the time that the state of the physical disks can be switched from a normal power consumption mode to a power saving mode. The time to save power 3245 decreases together with time. Further, the programs for distinguishing sender of commands 323, 423 reset the time to save power 3245 to the same value as the default power saving condition when there is access from the host computers 100, 101, 102. When there is access based on storage management that does not go through the host computer, the time to save power 3245 is not reset. The power saving condition table 324 stores information concerning the logical volumes of the storage apparatus 300. Incidentally, the power saving condition table 424 has the same columns as the power saving condition table 324, and has information concerning the logical volumes of the storage apparatus 400.

The host-volume correspondence tables 325, 425 of the storage apparatuses 300, 400 store information concerning the host computer permitted to access the logical volumes of the self-storage apparatus. Information stored in the host-volume correspondence tables 325, 425 is used by the respective programs for distinguishing sender of commands 323, 423.

Details of the host-volume correspondence table 325 are now explained with reference to FIG. 24. As shown in FIG. 24, the host-volume correspondence table 325 includes two columns; namely, a host WWN (World Wide Name) 3250 for uniquely identifying the host computer, and a volume identifier 3251 as an identifier of the logical volume of the storage apparatus 300 accessible from that host computer. Meanwhile, the host-volume correspondence table 425 has the same columns as the host-volume correspondence table 325, and has information regarding the logical volumes of the storage apparatus 400.

Figure 25:
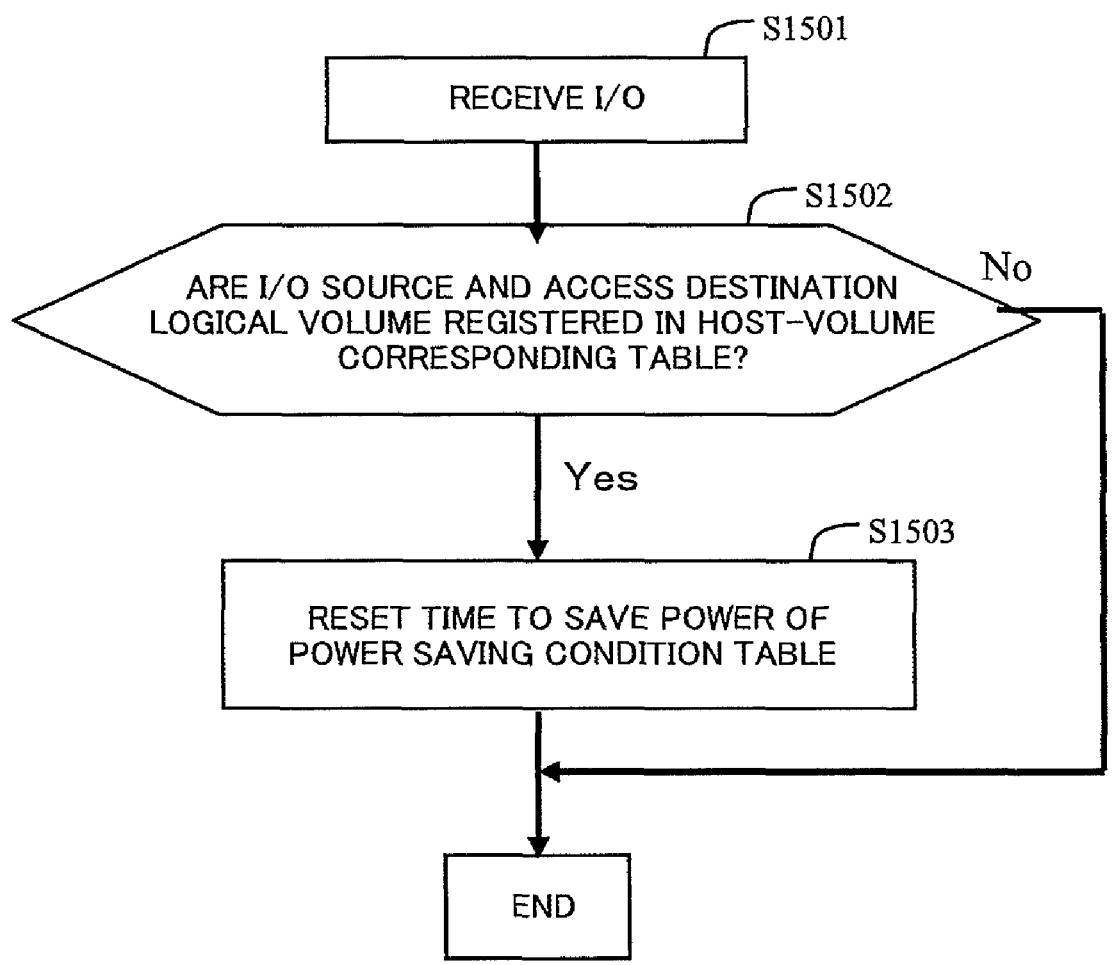
FIG. 25 shows the determination on distinguishing the sender of commands by the storage apparatus.

FIG. 25 shows the processing to be performed by the program for distinguishing sender of commands 323 when the storage apparatus 300 receives I/O. When the storage apparatus 300 receives I/O (S1501), the program for distinguishing sender of commands 323 determines whether the I/O source and the logical volume of the access destination of such I/O are registered in the host-volume correspondence table 325 (S1502). An I/O frame has information referred to as S_ID for identifying the frame source. The program for distinguishing sender of commands 323 reads this S_ID, and identifies the I/O source. When the I/O source is registered in the host-volume correspondence table 325, the time to save power 3245 of the power saving condition table 324 is reset to the default power saving condition 3244 (S1503). When the I/O source is not registered in the host-volume correspondence table 325, the processing is ended. Meanwhile, with the storage apparatus 400, the program for distinguishing sender of commands 423 refers to the host-volume correspondence table 425 and performs similar processing.

The processing based on the programs for distinguishing sender of commands 323, 423 shown in FIG. 25 is also implemented during the data transfer processing for storage management. The data transfer processing for storage management includes data migration processing and copy processing. As a result of the programs for distinguishing sender of commands 323, 423 performing the foregoing processing even during the implementation of the data migration processing or copy processing, it is possible to differentiate the access to the logical volume arising from the processing for storage management, and access to the logical volume from the host computers 101, 102, 103.

Processing of the storage system 900c shown in FIG. 21 is now explained with reference to FIG. 26 through FIG. 28.

Figure 26:
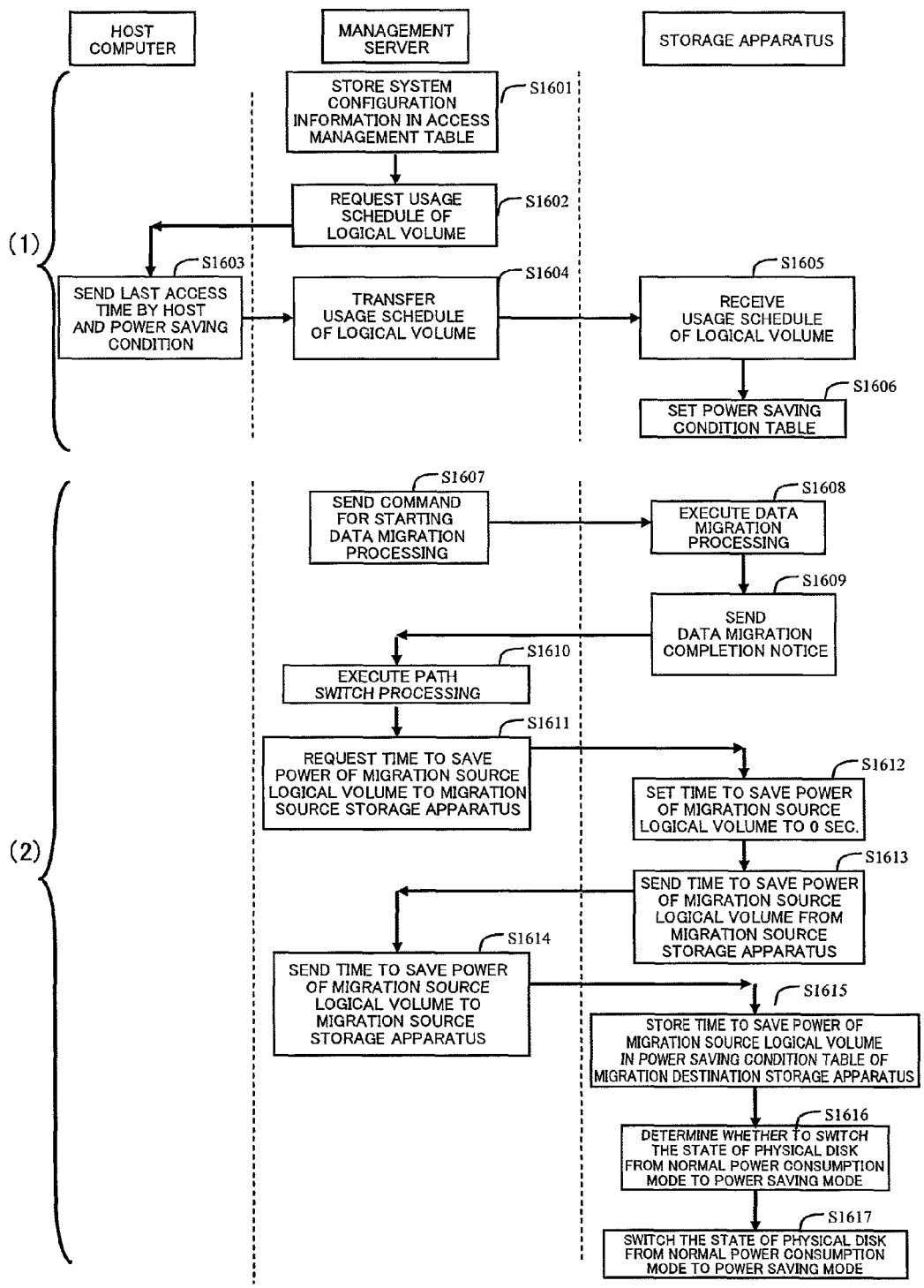
FIG. 26 shows the third mode of the overall processing flow.
Figure 27:
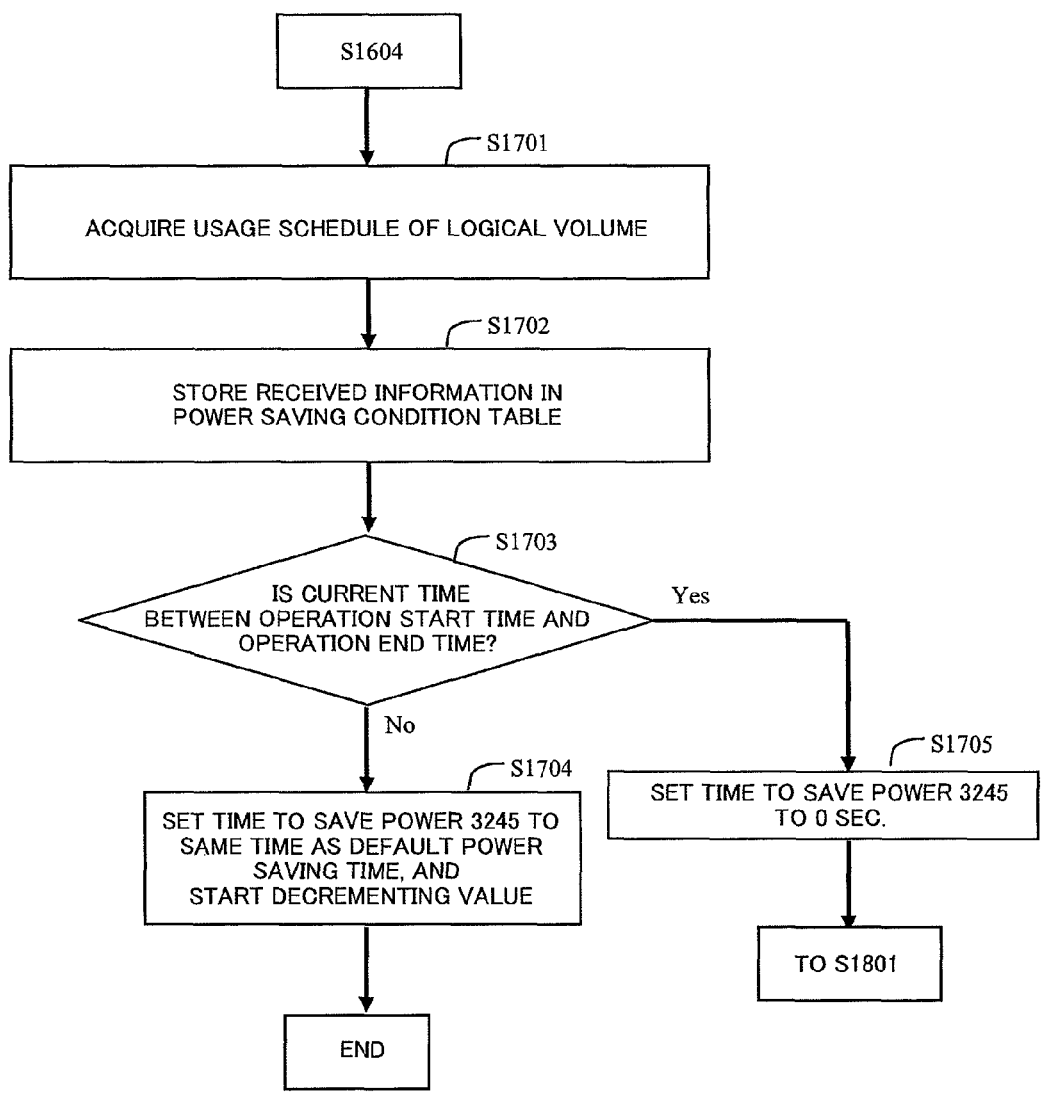
FIG. 27 shows the fourth mode of the processing flow by the storage apparatus.

FIG. 26(1) shows the processing for the initial setting of the storage system 900c, and FIG. 26(2) shows the processing in the case of performing data migration processing in the storage system 900c.

Foremost, at step S1601 of FIG. 26, as with the case of the storage system 900 of FIG. 1, the management server 200 reads the system configuration information of the storage apparatuses 300, 400 and the host computers 100, 101, 102 under its control based on the processing of the storage management program 221, and sets such system configuration information in the access management table 224c.

Subsequently, at step S1602, the management server 200 sends a request for information concerning the usage schedule of logical volumes to the host computers 100, 101, 102 based on the processing of the storage management program 221.

At step S1603, when the host computers 100, 101, 102 receive the request for information concerning the usage schedule of logical volumes from the management server 200, they read the operation start time 1243, the operation end time 1244, and the default power saving condition 1245 from the scheduling table 124 based on the processing of the agent program 121, and sends these to the management server 200.

At step S1604, the management server 200 transfers the information received from the host computers 100, 101, 102 to the storage apparatuses 300, 400 having the respective logical volumes based on the processing of the storage management program 221.

Subsequently, at step S1605 and step S1606, the storage apparatuses 300, 400 store the information received from the management server 200 in the power saving condition tables 324, 424.

Details of the processing at step S1605 and step S1606 to be performed by the storage apparatuses 300, 400 are now explained with reference to FIG. 27. When the storage apparatuses 300, 400 receive information (operation start time 1243, operation end time 1244, default power saving condition 1245) concerning the usage schedule of logical volumes from the management server 200 (S1701), the set such information in the operation start time 3242, the operation end time 3243, and the default power saving condition 3244 in the power saving condition table 324 of the storage apparatus 300 based on the processing of the power control program 322 (S1702). Subsequently, the storage apparatuses 300, 400 determine whether the current time is between the operation start time 3242 and the operation end time 3243 of the power saving condition table 324 based on the processing of the power control program 322 (S1703). When the current time is within the operation time, the time to save power 3245 is set to 0 based on the processing of the power control program 322 (S1705), and the routine proceeds to step S1801 of FIG. 28. When the current time is not within the operation time, at step S1204, the time to save power 3245 is set to the same value as the default power saving condition based on the processing of the power control program 322, and the value begins to decrease together with the lapse of time (S1704).

The initial setting of the storage system 900C shown in FIG. 21 is thereby complete.

Subsequently, at step S1607 of FIG. 26, the management server 200 sends a command to the storage apparatuses 300, 400 to perform data migration processing between the logical volumes based on the processing of the volume migration management program 222.

Subsequently, at step S1608, the storage apparatuses 300, 400 that received the command from the management server 200 execute the data migration processing between the logical volumes based on the processing of the volume migration programs 321, 421.

At step S1609, the volume migration management programs 321, 421 of the storage apparatuses 300, 400 send a data migration processing completion notice to the management server 200.

At step S1610, the management server 200 that received the data migration completion notice performs path switch processing the logical volumes based on the processing of the storage management program 221.

Processing at steps S1607 to S1610 is the same as the processing in the case of the storage system 900 shown in FIG. 1.

Subsequently, at step S1611, the management server 200 sends a request for the time to save power regarding the migration source logical volume to the data migration source storage apparatus 300 based on the processing of the power management program 223.

At step S1612, the storage apparatus 300 that received the request of the time to save power 2247 from the management server 200 foremost sets the time to save power 2247 corresponding to the migration source logical volume to 0 seconds.

Subsequently, at step S1613, the storage apparatus 300 reads the time to save power 2247 regarding the migration source logical volume from the power saving condition table 324 based on the processing of the power control program 322, and sends this to the management server 200.

At step S1614, the management server 200 stores the time to save power regarding the migration source logical volume received from the data migration source storage apparatus 300 in the time to save power 2247 of the access management table 224c based on the processing of the power management program, and then sends this to the data migration destination storage apparatus 400.

Subsequently, at step S1615, the data migration destination storage apparatus 400 sets the time to save power regarding the migration source logical volume received from the management server 200 in the time to save power 3245 corresponding to the migration destination logical volume of the power saving condition table 424 of the self-storage apparatus based on the processing of the power control program 422.

At step S1616 and step S1617, as with the processing at step S109 and step S110 of FIG. 5, the storage apparatuses 300, 400 respectively refer to the information stored in the power saving condition tables 324, 424 based on the processing of the power control programs 322, 422, determine whether to switch the state of the physical disks from a normal power consumption mode to a power saving mode, and switch the state of the physical disks from a normal power consumption mode to a power saving mode according to the determination result.

Details of the processing (S1616, S1617) where the storage apparatuses 300, 400 determine whether to switch the state of the physical disks from a normal power consumption mode to a power saving mode and controlling the physical disks according to the determination result are now explained with reference to FIG. 28. Foremost, at step S1801, the power control programs 322, 422 check the time to save power of all logical volumes configured from the physical disks containing the logical volumes to be migrated from the power saving condition tables 324, 424. Subsequently, at step S1802, the power control programs 322, 422 determine whether the time to save power of all logical volumes is 0 seconds. When the time to save power of all logical volumes is 0 seconds, the routine proceeds to step S1803. When there is a logical volume in which the time to save power is not 0 seconds, the routine returns to step S1801. At step S1803, the power control programs 322, 422 switch the state of the physical disks from a normal power consumption mode to a power saving mode. Subsequently, at step S1804, the processing of the power control programs 322, 422 determines whether the power saving time regarding all physical disks containing the logical volumes to be migrated is 0. If the process is complete, the processing is ended, and if the process if incomplete, the routine returns to step S1801.

Figure 28:
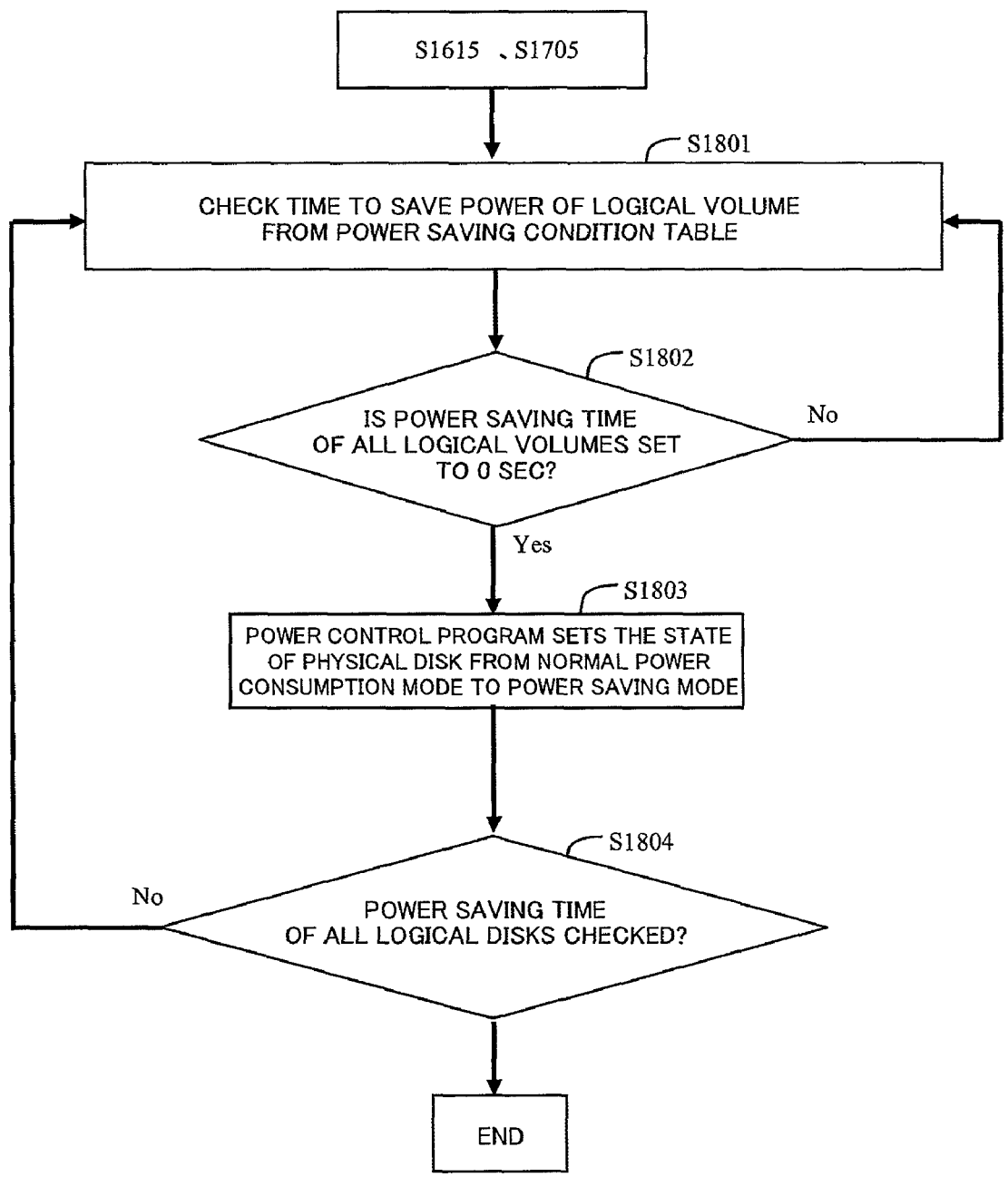
FIG. 28 shows the fifth mode of the processing flow by the storage apparatus.

The trigger for starting the processing shown in FIG. 28 is not limited to the completion of the data migration processing, and, for example, the trigger may be when the time to save power corresponding to one of the logical volumes becomes 0.

As described in the foregoing processing, based on the program for distinguishing sender of commands in the storage apparatus, it is possible to differentiate the access to physical disks as access from the host computer or access arising from the processing for managing the storage system, and the physical disks can thereby be controlled according the access from the host computer. Further, as a result of applying the power saving condition of the migration source logical volume to a logical volume of another storage system of the migration destination, the state of the logical volume can be switched from a normal power consumption mode to a power saving mode at an appropriate timing, and it is thereby possible to avoid unnecessary power consumption.

Figure 29:
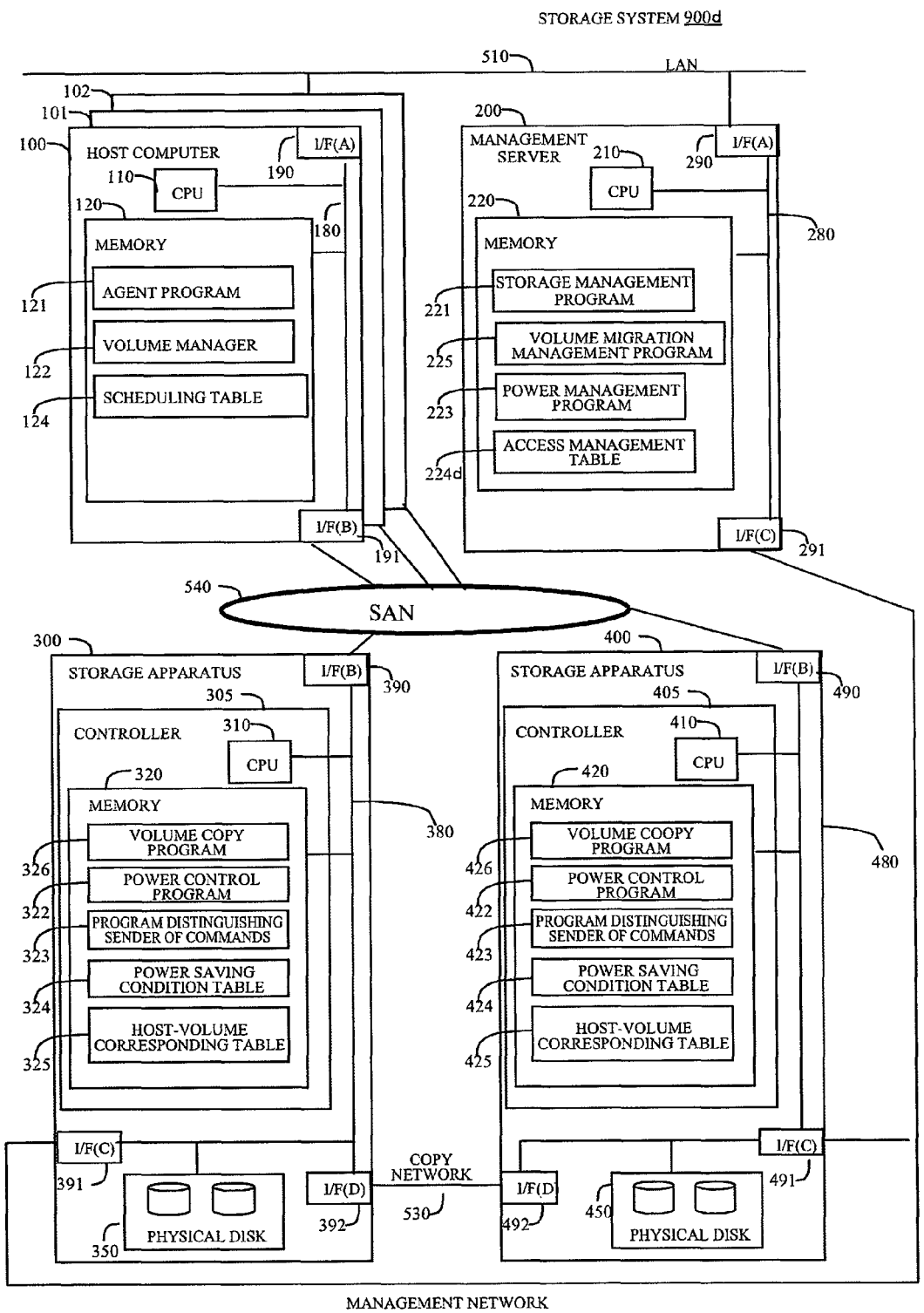
FIG. 29 shows the fourth mode of a system configuration.

FIG. 29 is a diagram showing the configuration of a storage system 900d as an application of the storage system 900c shown in FIG. 21. Although a case of implementing data migration processing was explained with the storage system 900c of FIG. 21, a case of implementing copy processing is explained with the storage system 900d shown in FIG. 29. This storage system 900d comprises a plurality of host computers 100, 101, 102, a management server 200, and storage apparatuses 300, 400. This configuration is basically the same as the configuration of the storage system 900c shown in FIG. 21. The difference from the storage system 900c shown in FIG. 21 is that the information of the access management table 224d in the memory 220 of the management server 200 is partially different, and that the copy management program 225 is provided instead of the volume migration management program 222. Further, the memories 320, 420 of the storage apparatuses 300, 400 store volume copy programs 326, 426 instead of volume migration programs 321, 421. FIG. 30 shows the details of the access management table 224d. The access management table 224d, as shown in FIG. 30, differs from the access management table 224c of FIG. 21 in that the migration destination volume identifier 2243c and the disks for composing volume of migration destination 2244c are respectively changed to copy destination volume identifier 2243d and disks for composing volume of copy destination 2244d. The copy management program 225 is a program for managing the copy processing of a plurality of storage apparatuses. The volume copy programs 326, 426 are programs for performing the respective copy processing of the storage apparatuses 300, 400.

The processing to be performed by the storage system 900d shown in FIG. 29 is now explained with reference to FIG. 31. The difference with FIG. 26 showing the data migration processing in the storage system 900c of FIG. 21 is that the migration processing start S1602 of FIG. 26 is changed to copy processing start S1902, the migration processing execution S1608 of FIG. 26 is changed to copy processing execution S1908, the path switch processing S1610 of FIG. 26 does not exist, and the expressions of migration source and migration destination used in steps S1611 to S1617 of FIG. 26 is changed to copy source and copy destination in steps S1910 to S1915 of FIG. 31. Further, the processing corresponding to processing S1612 of setting the time to save power of the migration source logical volume of FIG. 26 to 0 seconds does not exist in FIG. 31.

In the case of copy processing, even after the copy processing is complete, the path of the copy source logical volume and the host computer exists. In other words, even after the completion of copy processing, access from the host computer to the copy source logical volume will arise. Thus, just because the copy processing is complete, the state of the physical disks containing the copy source logical volumes cannot be immediately switched from a normal power consumption mode to a power saving mode. Thus, the power saving time corresponding to the copy source logical volume cannot be set to 0 seconds.

Figure 31:
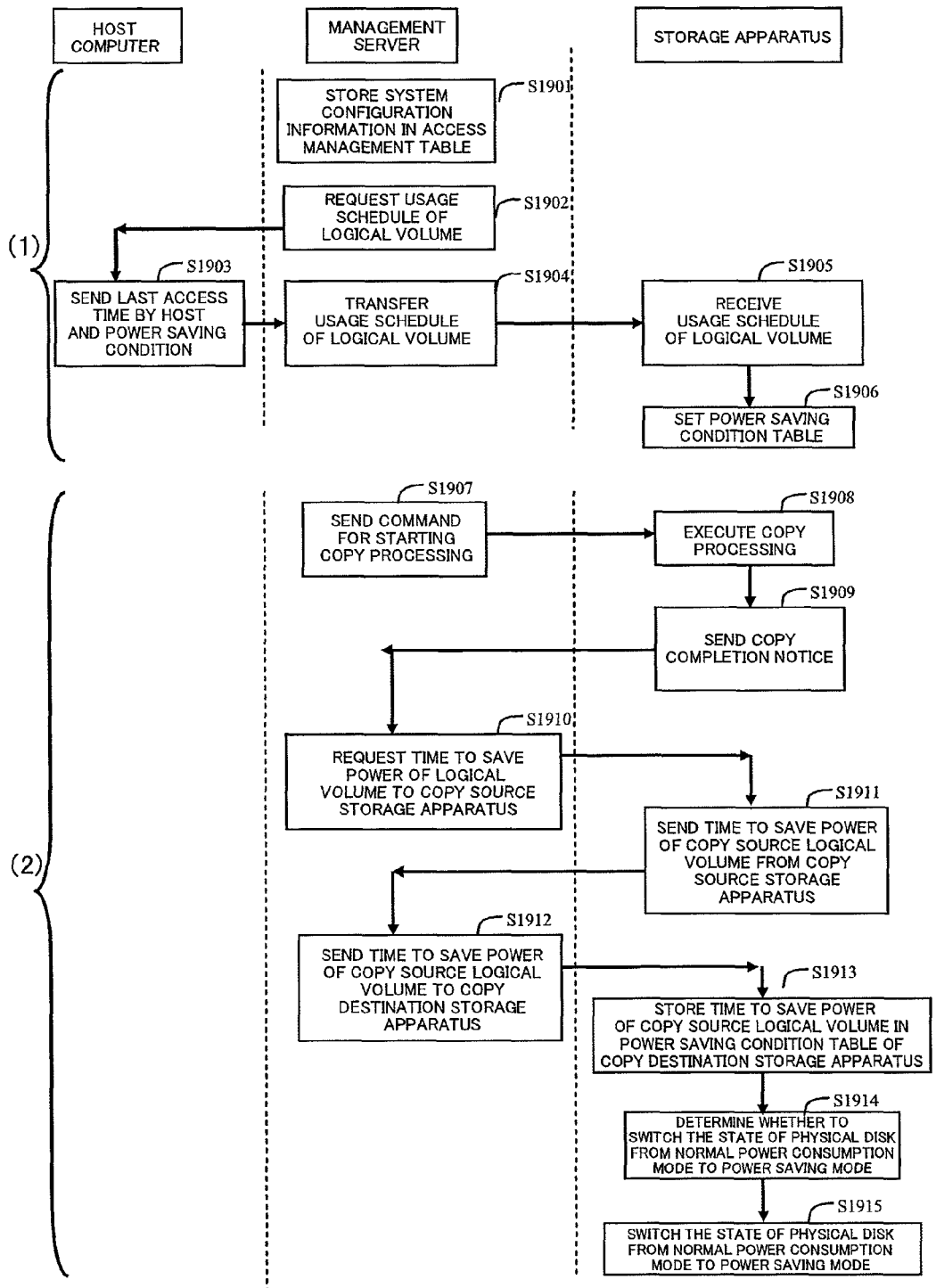
FIG. 31 shows the fourth mode of the overall processing flow.

Foremost, at steps S1901 to S1906 of FIG. 31, the initial setting of the storage system 900d shown in FIG. 29 is performed. This processing is the same as the initial setting of the storage system 900c shown in steps S1602 to S1606 of FIG. 26.

Subsequently, at step S1907 of FIG. 31, the copy management program 225 of the management server sends a copy start command to the storage apparatuses 300, 400.

At step S1908, the storage apparatuses 300, 400 that received the copy start command execute copy processing based on the processing of the volume copy programs 326, 426. When copy processing is complete, at step S1909, the storage apparatuses 300, 400 send a copy processing completion notice to the management server based on the processing of the volume copy programs 326, 426.

The processing shown in steps S1907 to S1909 of FIG. 31 is performed as with the processing of steps S1102 to S1104 of FIG. 17.

At step S1910, the management server 200 sends a request of time to save power corresponding to the copy source logical volume to the storage apparatus 300 based on the processing of the power management program 223.

At step S1911, the storage apparatus 300 that received the request of time to save power corresponding to the copy source logical volume from the management server 200 reads the time to save power 3247 from the power saving condition table 324 and sends this to the management server based on the processing of the power control program 322.

At step S1912, the management server 200 that received the time to save power corresponding to the copy source logical volume from the storage apparatus 300 stores the received information in the time to save power 2247 of the access management table 224d and sends the time to save power corresponding to the copy source logical volume to the storage apparatus 400 based on the processing of the power management program 223.

At step S1913, the storage apparatus 400 that received the time to save power corresponding to the copy source logical volume stores the time to save power corresponding to the copy source logical volume as the time to save power 3247 corresponding to the copy destination logical volume in the power saving condition table 424 based on the processing of the power control program 422.

At step S1914 and step S1915, as with the processing at step S1616 and step S1617 of FIG. 26, whether to switch the state of the physical disks 350, 450 of the storage apparatuses 300, 400 from a normal power consumption mode to a power saving mode is determined, and the state of the physical disks are switched from a normal power consumption mode to a power saving mode according to the determination result.

The foregoing processing is to be performed when performing copy processing in the storage system 900d shown in FIG. 29.

Unlike the data migration processing in the storage system 900c of FIG. 21, in the case of copy processing, after the completion of copy processing, the copy source logical volume will also be accessed as with the copy destination logical volume. Thus, it is necessary to perform the same processing as with the other logical volumes to the copy source logical volume without setting the time to save power to 0 seconds.

According to the foregoing processing, by applying the same power saving condition to the copy destination logical volume based on the power saving condition of the copy source logical volume, it is possible to perform power saving control of the physical disks according to the access from the host computer to the physical disks.

Figure 32:
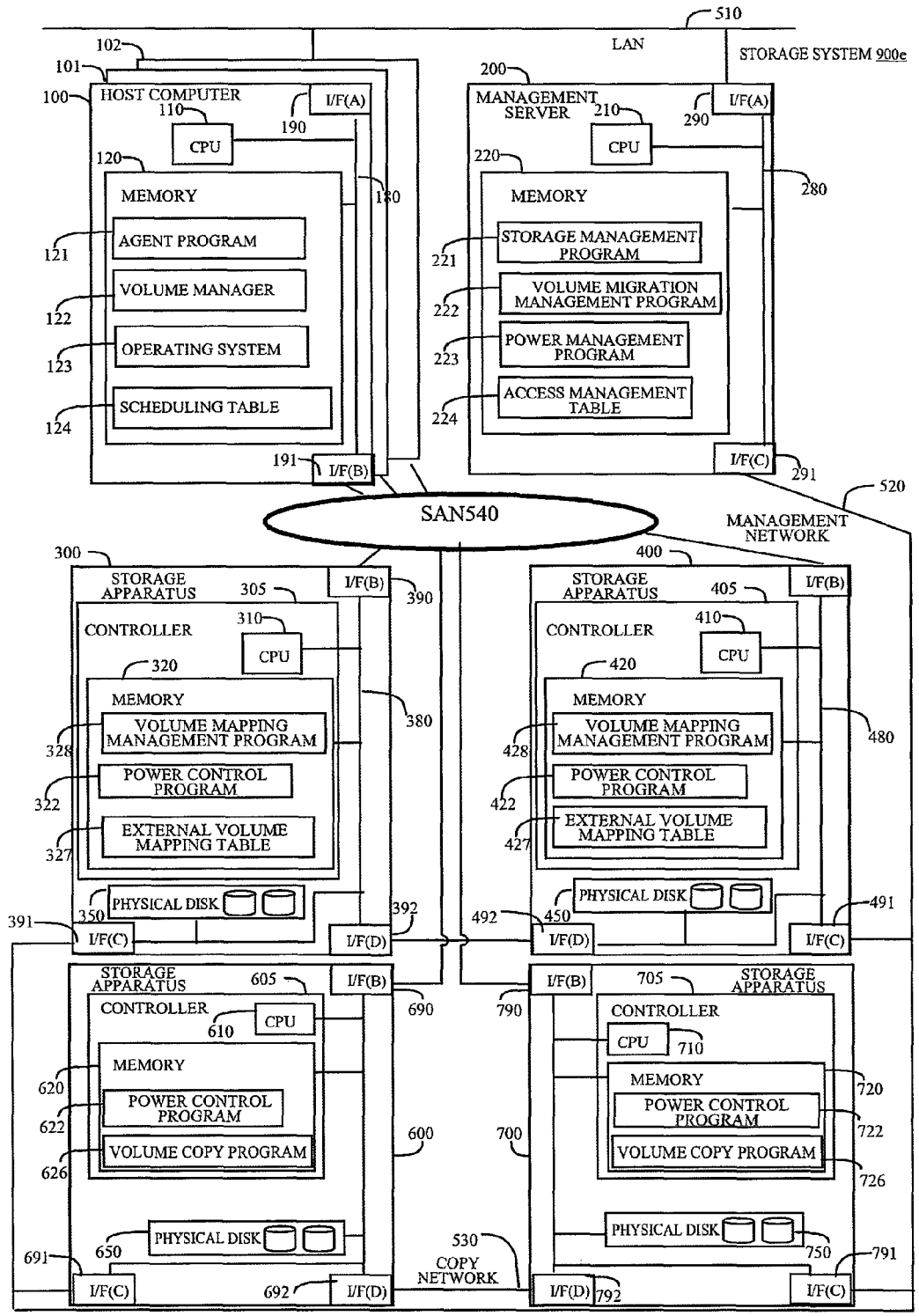
FIG. 32 shows the fifth mode of a system configuration.

FIG. 32 is a diagram showing the configuration of a storage system 900e as an application of the storage system 900 shown in FIG. 1. This storage system 900e comprises a plurality of host computers 100, 101, 102, a management server 200, and storage apparatuses 300, 400, 600, 700. This configuration is basically the same as the configuration of the storage system 900 of FIG. 1.

The difference from the storage system 900 shown in FIG. 1 is that the memories 320, 420 of the storage apparatuses 300, 400 contain external volume mapping tables 327, 427 and volume mapping management programs 328, 428, but do not contain power control programs 322, 422, and the storage apparatuses 600, 700 have been newly provided. The logical volumes configured from the physical disks 650, 750 of the storage apparatuses 600, 700 are respectively associated with the virtual volumes of the storage apparatuses 300, 400. In the storage system 900e, the host computers 100, 101, 102 recognize the logical volumes configured from the physical disks 650, 750 of the storage apparatuses 600, 700 as the virtual volumes of the storage apparatuses 300, 400. In other words, based on the processing of the volume mapping management program 328, 428, access from the host computers 100, 101, 102 to the virtual volumes of the storage apparatus 300 is actually made to the logical volumes of the storage apparatus 600, and the access to the virtual volumes of the storage apparatus 400 is actually made to the logical volumes of the storage apparatus 700. The storage apparatuses 600, 700 having this kind of relationship with the storage apparatuses 300, 400 are hereinafter referred to as external storage apparatuses. Further, in the storage system 900e, the logical volumes of the storage apparatus 600 and the logical volumes of the storage apparatus 700 are of a synchronous copy relationship. Synchronous copy will be described later.

Incidentally, the physical disks 350, 450 of the storage apparatuses 300, 400 may be omitted.

FIG. 33 shows the external volume mapping table 327 of the storage apparatus 300. As shown in FIG. 33, the external volume mapping table 327 includes four columns; namely, a volume identifier 3270 for identifying the virtual logical volume of the storage apparatus 300, an external port WWN 3271 showing the WWN (World Wide Name) as an identifier of a port of the storage apparatus 300 for connecting to the storage apparatus 600, an apparatus identifier 3272 of the external storage apparatus as an identifier of the external storage apparatus 600, and an external storage apparatus volume identifier 3273 as an identifier of the logical volume of the external storage apparatus 600 associated with the virtual volume of the storage apparatus 300.

Like this, the external volume mapping table 327 stores information concerning the association of the virtual volume of the storage apparatus 300 and the logical volume of the external storage apparatus, and is used by the volume mapping management program 328 upon executing the access from the host computers 100, 101, 102 to the virtual volume of the storage apparatus 300 as an access to the logical volume of the external storage apparatus 600.

Incidentally, the external volume mapping table 427 of the storage apparatus 400 also has the same columns, and is used by the volume mapping management program 428 upon executing the access from the host computers 100, 101, 102 to the virtual volume of the storage apparatus 400 as an access to the logical volume of the external storage apparatus 700.

The storage apparatus 600 of FIG. 32 includes a controller 605, a logical volume to be provided to the storage apparatus 300, physical disks 650 constituting the logical volume, an interface 690 for connecting to the storage area network SAN 540, an interface 691 for connecting to the management network MN 520, and an interface 692 for connecting to the copy network CN 530. Incidentally, there are one or more logical volumes. Further, there are one or more physical disks 650. One logical volume may be configured from a plurality of physical disks. The respective constituent elements are mutually connected via a bus 680. The controller 605 comprises a CPU 610 and a memory 620. Further, the memory 620 stores programs to be used by the CPU 610 upon executing various types of processing.

The memory 620 contains a volume copy program 626 and a power control program 622 to be executed by the CPU 610. The power control program 622 is a program for switching the state of the physical disks 650 to a power saving mode or a normal mode according to a command from the power management program 223 of the management server 200. The volume copy program 626 is a program for performing synchronous copy between the logical volumes of the storage apparatuses 600, 700. The term "synchronous copy" as used herein refers to a case where writing is performed into the logical volume of the storage apparatus 600, and the same writing is performed into the logical volume of the storage apparatus 700 based on the processing of the volume copy program 626. Incidentally, the configuration of the storage apparatus 700 is the same as the configuration of the storage apparatus 600.

Incidentally, with the storage system 900e, at least a part of the logical volumes of the storage apparatuses 600, 700 is of a synchronous copy status. In the storage system 900e, the logical volume of the storage apparatus 600 associated with the virtual volume of the storage apparatus 300 is of a synchronous copy status with the logical volume of the storage apparatus 700. In addition, the logical volume of the storage apparatus 700 in such synchronous copy status and the virtual volume of the storage apparatus 400 are associated. In other words, the contents in the virtual volumes of the storage apparatuses 300, 400 are the same.

When the host computers 100, 101, 102 perform writing into the virtual volume of the storage apparatus 300, writing is performed into the logical volume 650, and the same writing is performed into the logical volume of the storage apparatus 700 based on the volume copy program 626. When the host computers 100, 101, 102 read from the virtual volume of the storage apparatus 300, reading is only performed from the logical volume of the storage apparatus 600.

Figure 34:
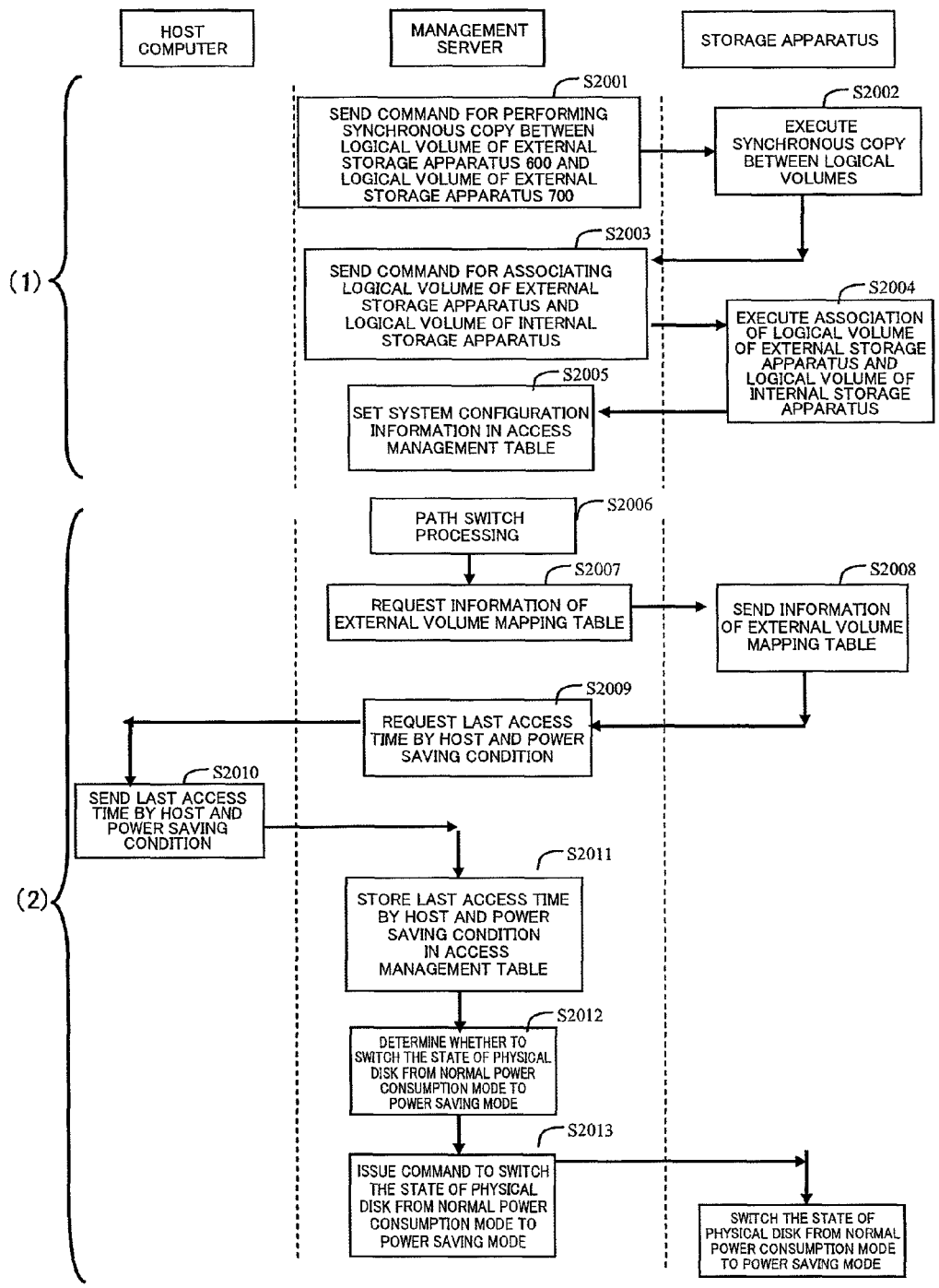
FIG. 34 shows the fifth mode of the overall processing flow.

FIG. 34 shows the processing of the storage system 900e.

FIG. 34(1) shows the processing for the initial setting of the storage system 900e. FIG. 34(2) shows the processing in the case that path switch processing arises in the storage system 900e. The term "path switching" as used herein refers to the switching of the path established between the host I/F 191 and the virtual volume of the storage apparatus 300 to the path between the host I/F 191 and the virtual volume of the storage apparatus 400.

Foremost, at step S2001, the storage management program 221 of the management server 200 sends a command to the storage systems 600, 700 to perform synchronous copy between the logical volumes.

Subsequently, at step S2002, the storage systems 600, 700 that received the command to perform synchronous copy perform synchronous copy of the logical volume of the storage apparatus 600 and the logical volume of the storage apparatus 700 based on the processing of the volume copy programs 626, 726, and notifies the management server that the logical volume of the storage apparatus 600 and the logical volume of the storage apparatus 700 migrated to a synchronous copy status.

Further, at step S2003, the storage management program 221 of the management server 200 sends a command to the storage apparatus 300 to associate the logical volume of the storage apparatus 600 and the virtual volume of the storage apparatus 300. Further, the storage management program 221 of the management server 200 also sends a command to the storage apparatus 400 to associate the logical volume of the storage apparatus 700 and the virtual volume of the storage apparatus 400.

At step S2004, the storage apparatuses 300, 400 that received the command associate the logical volumes and the virtual volumes according to the command from the management server based on the processing of the volume mapping management programs 328, 428, store the correspondence in the external volume mapping tables 327, 427, and send a processing completion notice to the management server 200.

At step S2005, the storage management program 221 of the management server 200 sets the system configuration information in the access management table 124*d*.

The initial setting of the storage system 900*e* is thereby completed.

Subsequently, at step S2006, the storage management program 221 of the management server 200 coordinates with the volume manager 122 of the host computers 100, 101, 102, and, as described above, switches the path established between the host I/F 191 and the virtual volume of the storage apparatus 300 to the path between the host I/F 191 and the virtual volume of the storage apparatus 400.

Further, at step S2007, the storage management program 221 of the management server 200 requests the storage apparatuses 300, 400 for information concerning the logical volume of the external storage apparatus associated with the virtual volume to be subject to path switching.

Subsequently, at step S2008, the storage apparatuses 300, 400 that received the request from the storage management program 221 of the management server 200 refer to the external volume mapping table, and sends to the management server 200 information concerning the logical volume of the external storage apparatus associated with the virtual volume to be subject to path switching.

Subsequently, at step S2009, the storage management program 221 of the management server 200 requests the agent program of the host computers 100, 101, 102 for the last access time by host and the power saving condition corresponding to the virtual volume to be subject to path switching, and the last access time by host and the power saving condition corresponding to the logical volume contained in the physical disks constituting the logical volume corresponding to the virtual volume to be subject to path switching.

Subsequently, at step S2010, the agent program 121 of the host computers 100, 101, 102 that received the request for the last access time by host and the power saving condition from the management server 200 refers to the scheduling table 124, and sends the requested last access time by host and power saving condition to the management server.

Subsequently, at step S2011, the storage management program 221 of the management server stores the last access time by host and the power saving condition received from the host computer in the access management table 224. Thereupon, the last access time by host and the power saving condition regarding the logical volume of the storage apparatus 600 associated with the virtual volume of the storage apparatus 300, and the last access time by host and the power saving condition regarding the logical volume of the storage apparatus 700 associated with the virtual volume of the storage apparatus 400 are switched and stored.

Subsequently, at step S2012, the power management program 223 of the management server 200, as with the processing at steps S109 and S110 of FIG. 5, refer to the information of the access management table 224*e* and determines whether the state of the physical disks can be switched from a normal power consumption mode to a power saving mode regarding the physical disks constituting the logical volume corresponding to the virtual volume to be subject to path switching.

Subsequently, at step S2013, the power management program 223 of the management server 200 sends a command to the storage apparatuses 600, 700 to switch the state of the physical disks from a normal power consumption mode to a power saving mode according to the determination result.

At step S2014, the power control programs 622, 722 of the storage apparatuses 600, 700 that received the command switch the state of the physical disks from a normal power consumption mode to a power saving mode according to the command.

According to the foregoing processing, by shortening the time required for the path switching processing based on storage management in a storage apparatus associated with an external storage apparatus, information corresponding to the logical volume of the storage apparatus before the path switching can be applied as the information corresponding to the logical volume of the storage apparatus after the path switching so as to switch the logical volume from a normal power consumption mode to a power saving mode at an appropriate timing.

What is claimed is:

1. A storage system comprising:
   a first storage apparatus including a plurality of first physical disks and providing a first logical volume configured from said plurality of first physical disks to a host computer;
   a second storage apparatus including a plurality of second physical disks and providing a second logical volume configured from said plurality of second physical disks to said host computer; and
   a management server adapted to manage operation of said first storage apparatus and said second storage apparatus;
   wherein said first storage apparatus includes a first memory, and a first processor;
   wherein said second storage apparatus includes a second memory, and a second processor;
   wherein when said first processor receives an instruction, which instructs data migration from said first volume in said first storage apparatus to said second volume in said second storage apparatus, from said management server, said first processor is adapted to read data stored in the first logical volume and send said data to the second storage apparatus,
   wherein said second processor is adapted to receive said data sent from said first storage apparatus and make access to said second logical volume to store said data,
   wherein said management server is adapted to obtain information concerning a last access time to said first volume by said host computer, said last access which is a last time of the last access from said host computer to said first logical volume that is a source volume of said data migration, and
   wherein, if a predetermined time period has elapsed from said last access time without an access to said second volume of said second storage system from said host computer, the management server sends an instruction to the second storage apparatus to switch a state of said plurality of second physical disks configuring said second logical volume from a normal power consumption mode to a power saving mode.

2. The storage system according to claim 1,
   wherein the second processor of said second storage apparatus, after the access for said data transfer is complete:

acquires from said first storage apparatus the information concerning said power saving time of said first logical volume in said memory of said first storage apparatus;

stores said acquired information as said power saving time of said second logical volume in said memory of said second storage apparatus;

determines that the state of said plurality of second physical disks configuring said second logical volume is to be switched from the normal power consumption mode to the power saving mode when said power saving time of each of said plurality of logical volumes contained in said plurality of second physical disks configuring said second logical volume is 0; and switches the state of said plurality of second physical disks configuring said second logical volume from the normal power consumption mode to the power saving mode.

3. The storage system according to claim 1, wherein, when the access for said data transfer is data migration from said first logical volume to said second logical volume, said processor of said first storage apparatus, after the access for said data transfer is complete:

determines that a state of a plurality of the first physical disks configuring said first logical volume is to be switched from the normal power consumption mode to the power saving mode when said power saving time of each of said plurality of logical volumes other than said first logical volume contained in said plurality of first physical disks configuring said first logical volume stored in said memory of said first storage apparatus is 0; and switches the state of said first physical disks configuring said first logical volume from the normal consumption mode to the power saving mode.

4. The storage system according to claim 1, wherein, when the access for said data transfer is data copy from said first logical volume to said second logical volume, said processor of said first storage apparatus, after the access for said data transfer is complete:

determines that a state of a plurality of first physical disks configuring said first logical volume is to be switched from the normal power consumption mode to the power saving mode when said power saving time of each of said plurality of logical volumes contained in said plurality of first physical disks configuring said first logical volume stored in said memory of said first storage apparatus is 0; and switches the state of said plurality of first physical disks configuring said first logical volume from the normal power consumption mode to the power saving mode.

* * * * *